(12) United States Patent
Onodera et al.

(10) Patent No.: US 6,729,315 B2
(45) Date of Patent: May 4, 2004

(54) EXHAUST GAS RECIRCULATION CONTROL APPARATUS FOR INTERNAL COMBUSTION ENGINE

(75) Inventors: Yasuyuki Onodera, Oyama (JP); Fumihide Sato, Oyama (JP); Yoshiki Kanzaki, Oyama (JP); Toshihiko Nishiyama, Oyama (JP); Takahisa Iino, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/378,936

(22) Filed: Mar. 5, 2003

(65) Prior Publication Data

US 2003/0127079 A1 Jul. 10, 2003

Related U.S. Application Data

(62) Division of application No. 09/669,376, filed on Sep. 26, 2000, now Pat. No. 6,564,784.

(30) Foreign Application Priority Data

Sep. 30, 1999 (JP) ............................................ 11-279792
May 10, 2000 (JP) ........................................ 2000-137769

(51) Int. Cl.[7] ............................................. F02M 25/07
(52) U.S. Cl. .................. 123/568.21; 60/605.2
(58) Field of Search ........................... 123/698, 568.21; 60/605.2; 701/108

(56) References Cited

U.S. PATENT DOCUMENTS

| 4,426,848 A | 1/1984 | Stachowicz |
| 5,671,600 A | 9/1997 | Pischinger et al. |
| 5,740,785 A | 4/1998 | Dickey et al. |
| 5,802,846 A | 9/1998 | Bailey |
| 6,116,026 A | 9/2000 | Freese, V |
| 6,138,650 A | 10/2000 | Bailey |
| 6,276,139 B1 | 8/2001 | Moraal et al. |
| 6,301,888 B1 | 10/2001 | Gray, Jr. |

FOREIGN PATENT DOCUMENTS

| JP | 58-93946 | 6/1983 |
| JP | 10-281018 | 10/1998 |

*Primary Examiner*—John Kwon
(74) *Attorney, Agent, or Firm*—Armstrons, Kratz, Quintos, Hanson & Brooks, LLP

(57) ABSTRACT

In an internal combustion engine having an exhaust gas recirculation circuit, the efficiency of a turbocharger is raised in a wide engine rotational speed area and, even when a pressure in an intake circuit is higher than that in an exhaust circuit, an exhaust gas can be circulated. For this purpose, an openable intake throttle valve (12e) is provided on the more upstream side than an exhaust gas circulation position of the intake circuit (12), or a narrow portion (12b) is formed on the exhaust gas circulation position of the intake circuit and an intake bypass circuit (12c) for bypassing the narrow portion is provided. Further, an intake and exhaust bypass circuit (20) for connecting the intake circuit to the exhaust circuit (16) is provided. Then, the opening degree of the intake throttle valve or intake bypass circuit and the opening degree of the intake and exhaust bypass circuit are adjusted so as to set the pressure at the exhaust gas circulation position of the intake circuit to be lower than that in an exhaust manifold (16a).

3 Claims, 12 Drawing Sheets

EXHAUST GAS RECIRCULATION CONTROL APPARATUS FOR INTERNAL COMBUSTION ENGINE

This is a divisional of application Ser. No. 09/669,376, filed Sep. 26, 2000, now U.S. Pat. No. 6,564,784.

BACKGROUND OF THE INVENTION

1. Field of the Invention

The present invention relates to an exhaust gas recirculation control apparatus for an internal combustion engine and, more particularly, to an exhaust gas recirculation control apparatus for an engine having a turbocharger.

2. Description of the Related Art

In the present situation where more restrictive regulations against harmful material exhausted from an internal combustion engine have been advanced in many places from the viewpoint of an environmental protection, as a method of reducing the harmful matters contained in an exhaust gas of the internal combustion engine, exhaust gas recirculation (EGR) has been widely known and used. It has the following operation. A portion of an exhaust gas exhausted from a combustion chamber is recirculated from an exhaust manifold to an intake manifold and mixed with intake air, and the mixture is again supplied to the combustion chamber, so that the concentration of oxygen in the intake air is reduced and a combustion temperature is decreased. The EGR has such a large effect that the occurrence of the harmful matters contained in the exhaust gas, particularly, nitride oxide (hereinbelow, referred to as $NO_x$) is suppressed.

FIG. 13 shows an intake and exhaust circuit diagram of an engine 14 with a turbocharger having a conventional exhaust gas recirculation circuit. The engine 14 comprises: a turbocharger 11; an intake circuit 12; an aftercooler 13; an exhaust gas recirculation circuit 15; an exhaust circuit 16; and an exhaust pressure control valve 18. Intake air compressed by a compressor 11a of the turbocharger 11 passes through the intake circuit 12, is cooled by the aftercooler 13 provided in the middle of the circuit 12, and is introduced to an engine main body 14a through an intake manifold 12a. The exhaust gas exhausted from the engine main body 14a flows into the turbocharger 11 through the exhaust circuit 16 to drive a turbine 11b, and is then exhausted. The exhaust pressure control valve 18 capable of adjusting an outlet pressure in the turbine 11b is provided at the outlet of the turbine 11b, The exhaust gas recirculation circuit 15 is branchingly connected in such a manner that one end is connected in the vicinity of an exhaust manifold 16a of the exhaust circuit 16 and the other end is connected in the vicinity of the intake manifold 12a of the intake circuit 12. The exhaust gas recirculation circuit 15 has: an EGR valve 15c whose opening area can be controlled so that the exhaust gas recirculation circuit 15 can be opened or closed; and an EGR cooler 15b for cooling the circulated exhaust gas. When the exhaust gas is circulated, the EGR valve 15c is first opened. A part of the exhaust gas is separated in the exhaust circuit 16 and cooled by the EGR cooler 15b, and after that, it is mixed with the intake air in the intake circuit 12. The mixture is introduced into the engine main body 14a.

However, the above intake and exhaust circuit has the following problems.

(1) When the engine 14 is driven under certain conditions, for example, at a medium or high speed under high loads, the pressure in the intake manifold 12a is higher than that of the exhaust manifold 16a in some cases. Generally, the reason is that the engine is designed so that the characteristics of the turbocharger match with the frequently used driving conditions to raise the efficiency of the engine and obtain high power and low fuel economy. Because the pressure at the intake side is higher and the pressure at the exhaust side is lower, an intake and exhaust resistance serving as a loss of power becomes smaller. In this case, because the exhaust gas is not circulated, the harmful component contained in the exhaust gas cannot be reduced. The exhaust gas is circulated only under such driving conditions that the pressure in the intake manifold 12a is lower than that in the exhaust manifold 16a, for example, during driving at a low speed under low loads. Accordingly, the driving conditions where the exhaust gas recirculation circuit is operated to enable the harmful component in the exhaust gas to be reduced are restricted.

(2) When the circulation amount of the exhaust gas increases or decreases in association with a change in the opening degree of the EGR valve 15c, an intake flow rate to be introduced to the engine main body 14a is fluctuated as a result of a fluctuation in pressure in the intake manifold 12a. When the intake flow rate is fluctuated, the amount of oxygen to be used for combustion is fluctuated and a stable combustion state cannot be obtained, so that the rotational speed of the engine is varied.

In order to solve the above problem (1), as a method of raising the pressure of the exhaust manifold 16a so as to be higher than that of the intake manifold 12a, thereby realizing the circulation of the exhaust gas, there is a method of throttling the exhaust pressure control valve 18. According to this method, the exhaust pressure control valve 18 is throttled to raise the outlet pressure of the turbine 11b, so that the pressure of the exhaust manifold 16a located on the upstream of the turbine 11b is raised and, even if the engine 14 is driven at a medium speed or under medium loads, the exhaust gas can be circulated.

However, there is a limitation in the driving conditions of the engine 14 in which the circulation of the exhaust gas can be performed with such a method. When the pressure in the exhaust manifold 16a is excessively raised, the exhaust efficiency of the engine 14 decreases, so that the fuel economy is reduced. Accordingly, the pressure of the exhaust manifold 16a can be merely raised to such a degree that the deterioration in fuel economy can be permitted. Therefore, the range of the driving conditions of the engine 14 in which the circulation of the exhaust gas can be performed is wider than that of the engine having no exhaust pressure control valve 18 but it is limited to a narrow range.

SUMMARY OF THE INVENTION

According to the present invention, to solve the above problems, it is an object to provide an exhaust gas recirculation control apparatus for an internal combustion engine, in which while fuel economy is maintained and improved, an exhaust gas can be circulated under driving conditions of such a wide range from a low-speed and low-load area to a high-speed and high-load area and, further, a fluctuation in rotational speed accompanied with switching the circulation of the exhaust gas can be suppressed as much as possible.

To accomplish the above object, according to a first aspect of the present invention, there is provided an exhaust gas recirculation control apparatus for an internal combustion engine, in which between an intake circuit and an exhaust circuit, a turbocharger and an exhaust gas recirculation circuit that is openable by exhaust gas recirculation switching valves are provided, comprising: an intake and exhaust bypass circuit for connecting the downstream side of a compressor to the upstream side of a turbine of the turbocharger: and an intake and exhaust bypass valve whose opening area can be varied so that the intake and exhaust bypass circuit can be opened or closed, wherein an intake throttle valve whose opening area can be varied so that the intake circuit can be opened or closed is provided on the upstream side of the position of the intake circuit where the exhaust gas recirculation circuit is branchingly connected.

According to the first aspect of the present invention, a portion of the exhaust gas is allowed to flow into the exhaust circuit through the intake and exhaust bypass circuit, its flow rate can be simultaneously adjusted by the intake and exhaust bypass valve, and a loss of pressure can be generated in the intake circuit by the intake throttle valve. Consequently, even under such driving conditions that the circulation of the exhaust gas cannot be performed because the pressure in the intake circuit is higher than that in the exhaust circuit, the pressure in the intake manifold is reduced so as to be lower than that in the exhaust manifold, so that the exhaust gas can be circulated. Accordingly, under driving conditions of such a wide range from the low-speed and low-load area to the high-speed and high-load area, the exhaust gas recirculation circuit is operated, so that the harmful components in the exhaust gas can be reduced.

According to a second aspect of the present invention, there is provided an exhaust gas recirculation control apparatus for an internal combustion engine, in which between an intake circuit and an exhaust circuit, a turbocharger and an exhaust gas recirculation circuit that is openable by exhaust gas recirculation switching valves are provided, comprising: an intake and exhaust bypass circuit for connecting the downstream side of a compressor to the upstream side of a turbine of the turbocharger; and an intake and exhaust bypass valve whose opening area can be varied so that the intake and exhaust bypass circuit can be opened or closed, wherein a narrow portion is formed on the position of the intake circuit to which the exhaust gas recirculation circuit is branchingly connected.

According to the second aspect of the present invention, a portion of the exhaust gas is allowed to flow into the exhaust circuit through the intake and exhaust bypass circuit, its flow rate can be simultaneously adjusted by the intake and exhaust bypass valve, and a flow velocity of intake air is raised by the narrow portion of the intake circuit to enable its pressure to be partially reduced. Consequently, even under such driving conditions that the circulation of the exhaust gas cannot be performed because the pressure in the intake circuit is higher than that in the exhaust circuit, a decrease in pressure of the narrow portion is used to enable the exhaust gas to be circulated. Accordingly, under driving conditions of such a wide range from the low-speed and low-load area to the high-speed and high-load area, the exhaust gas recirculation circuit is operated, so that the harmful component in the exhaust gas can be reduced.

According to a third aspect of the present invention, in the exhaust gas recirculation control apparatus for the internal combustion engine according to the first aspect of the present invention, a narrow portion is formed on the position of the intake circuit to which the exhaust gas recirculation circuit is branchingly connected.

According to the third aspect of the present invention, both of the characteristics of the first and second aspects of the present invention are provided. Consequently, under driving conditions of a wider range, the exhaust gas recirculation circuit is operated to enable the harmful component in the exhaust gas to be reduced.

According to a fourth aspect of the present invention, in the exhaust gas recirculation control apparatus for the internal combustion engine according to the first or third aspect of the present invention, there are provided detecting means for detecting driving conditions of the internal combustion engine containing an $NO_X$ exhaust amount; storage means for previously storing a target $NO_X$ exhaust amount for the driving conditions of the internal combustion engine; and control means for controlling the valve opening degree of each of the intake and exhaust bypass valve and the exhaust throttle valve in accordance with the driving conditions of the internal combustion engine so that the $NO_X$ exhaust amount of the internal combustion engine detected by the detecting means is equal to the target $NO_X$ exhaust amount stored by the storage means.

According to the fourth aspect of the present invention, first under driving conditions of a wide range of the internal combustion engine, the exhaust gas recirculation circuit is operated, thereby enabling the harmful component in the exhaust gas to be reduced. Further, since the valve opening degree of each of the intake and exhaust bypass valve and the intake throttle valve is controlled in correspondence to the driving conditions of the internal combustion engine, even under such use that the driving conditions of the internal combustion engine such as rotational speed and loads are changed momently, the exhaust gas recirculation circuit is operated so that the exhaust amount of $NO_X$ is approximated to a target value, so that a fine control to reduce the exhaust amount of $NO_X$ can be performed.

According to a fifth aspect of the present invention, in the exhaust gas recirculation control apparatus for the internal combustion engine according to the second aspect of the present invention, there are provided: an intake bypass circuit for bypassing the narrow portion of the intake circuit; and an intake bypass valve whose opening area can be varied so that the intake bypass circuit can be opened or closed.

According to the fifth aspect of the present invention, in addition to the second aspect of the present invention, the intake air can be introduced to the engine main body through the intake bypass circuit without being passed through the narrow portion. Consequently, when the exhaust gas can be circulated without depending on the above-mentioned operation of the narrow portion to reduce the pressure or when the circulation of the exhaust gas is not needed, the intake air is introduced to the engine main body through the intake bypass circuit, so that a decrease in engine efficiency due to the resistance at the narrow portion can be prevented. The flow rate of the intake air passing through the narrow portion can be adjusted by controlling the opening degree of the intake bypass valve, so that the intake pressure of the narrow portion can be adjusted more freely. Therefore, under the driving conditions of the internal combustion engine over a range wider than that of the third aspect of the present invention, the exhaust gas recirculation circuit is operated, so that the harmful component in the exhaust gas can be reduced.

According to a sixth aspect of the present invention, in the exhaust gas recirculation control apparatus for the internal combustion engine according to the fifth aspect of the present invention, there are provided: detecting means for detecting driving conditions of the internal combustion engine containing an $NO_X$ exhaust amount; storage means for previously storing a target $NO_X$ exhaust amount for the driving conditions of the internal combustion engine; and control means for controlling the valve opening degree of each of the intake and exhaust bypass valve and the intake throttle valve in accordance with the driving conditions of the internal combustion engine so that the $NO_X$ exhaust amount of the internal combustion engine detected by the detecting means is equal to the target $NO_X$ exhaust amount stored by the storage means.

According to the sixth aspect of the present invention, in addition to the fifth aspect of the present invention, the valve opening degree of each of the intake and exhaust bypass valve and the intake throttle valve is controlled in accordance with the driving conditions of the internal combustion engine. Therefore, under such use that the driving conditions of the internal combustion engine such as rotational speed and loads are changed momently, the exhaust gas recirculation circuit is operated so that the exhaust amount of $NO_X$ is approximated to a target value, so that a fine control to reduce the exhaust amount of $NO_X$ can be performed. The opening degree of the intake bypass valve is adjusted to enable the flow rate of the intake air passing through the narrow portion to be controlled, so that the intake air pressure of the narrow portion can be more freely adjusted. Therefore, under the driving conditions of the internal combustion engine over a range wider than that of the fourth aspect of the present invention, the exhaust gas recirculation circuit is operated to enable the harmful component in the exhaust gas to be reduced.

According to a seventh aspect of the present invention, in the exhaust gas recirculation control apparatus according to the fifth aspect of the present invention, there are provided: detecting means for detecting the driving conditions of the internal combustion engine containing an $NO_X$ exhaust amount; storage means for previously storing a target $NO_X$ exhaust amount for the driving conditions of the internal combustion engine; and control means for controlling in such a manner that when the internal combustion engine is driven at a high speed under high loads, while the intake and exhaust bypass valve is substantially closed, the opening degree of the intake bypass valve is controlled so that the $NO_X$ exhaust amount of the internal combustion engine detected by the detecting means is equal to the target $NO_X$ exhaust amount stored by the storage means and, when the internal combustion engine is driven at a medium speed under high loads, while the intake and exhaust bypass valve is substantially completely opened, the intake bypass valve is substantially closed.

According to the seventh aspect of the present invention, in addition to the fifth aspect of the present invention, during driving at a high speed under high loads during which the intake flow rate is large, the operation of the narrow portion is remarkably shown, and the exhaust gas can be circulated without no flow in the intake and exhaust bypass, since the intake and exhaust bypass valve is closed, a reduction in charging efficiency of the intake air caused by the intake and exhaust bypass flow can be suppressed. Therefore, the fuel economy during driving of the internal combustion engine at a high speed is improved. During driving at a medium speed under high loads during which the intake flow rate is reduced and the operation of the narrow portion is deteriorated, the intake bypass valve is substantially closed, the total amount of the intake flow is supplied to the narrow portion to reduce the pressure of the narrow portion, and simultaneously, the intake and exhaust bypass valve is opened as much as possible to reduce the pressure in the intake circuit, so that the synergistic effect is derived. Therefore, the EGR rate is raised to the maximum value and the $NO_X$ exhaust amount is suppressed to the minimum value.

According to an eighth aspect of the present invention, in the exhaust gas recirculation control apparatus for the internal combustion engine according to the first or third aspect of the present invention, there are provided: detecting means for detecting the driving conditions of the internal combustion engine containing the EGR rate; storage means for previously storing a target EGR rate for the driving conditions of the internal combustion engine; and control means for controlling the valve opening degree of each of the intake and exhaust bypass valve and the intake throttle valve in accordance with the driving conditions of the internal combustion engine so that the EGR rate of the internal combustion engine detected by the detecting means is equal to the target EGR rate stored by the storage means.

According to the eighth aspect of the present invention, under the driving conditions over a wide area of the internal combustion engine, the exhaust gas recirculation circuit is operated to enable the harmful component in the exhaust gas to be reduced. In addition, the valve opening degree of each of the intake and exhaust bypass valve and the intake throttle valve is controlled in correspondence to the driving conditions of the internal combustion engine. Therefore, even under such use that the driving conditions of the internal combustion engine such as rotational speed and loads are changed momently, the exhaust gas recirculation circuit is operated so that the exhaust amount of $NO_X$ is approximated to the target value by approximating the EGR rate to the target value, so that a fine control to reduce the exhaust amount of $NO_X$ can be performed. Further, the EGR rate is used as a controlled variable instead of the $NO_X$ exhaust amount, so that the expensive $NO_X$ detecting device is not needed and the cost can be reduced.

According to a ninth aspect of the present invention, in the exhaust gas recirculation control apparatus for the internal combustion engine according to the fifth aspect of the present invention, there are provided: detecting means for detecting the driving conditions of the internal combustion engine containing the EGR rate; storage means for previously storing a target EGR rate for the driving conditions of the internal combustion engine; and control means for controlling the valve opening degree of each of the intake and exhaust bypass valve and the intake bypass valve in accordance with the driving conditions of the internal combustion engine so that the EGR rate of the internal combustion engine detected by the detecting means is equal to the target EGR rate stored by the storage means.

According to the ninth aspect of the present invention, in addition to such a fact that the exhaust gas recirculation circuit is operated under the driving conditions over a wide range of the internal combustion engine to enable the harmful component in the exhaust gas to be reduced, the valve opening degree of each of the intake and exhaust bypass valve and the intake bypass valve is controlled in correspondence to the driving conditions of the internal combustion engine. Accordingly, even under such use that the driving conditions of the internal combustion engine such as rotational speed and loads are changed momently, the exhaust gas recirculation circuit is operated so that the exhaust amount of $NO_X$ is approximated to the target value by approximating the EGR rate to the target value, so that a fine control to reduce the exhaust amount of $NO_X$ can be performed. Further, the EGR rate is used as a controlled variable instead of the $NO_X$ exhaust amount, so that the expensive $NO_X$ detecting device is not needed and the cost can be reduced. The flow rate of the intake air passing through the narrow portion can be adjusted by controlling the opening degree of the intake bypass valve, so that the intake pressure of the narrow portion can be more freely adjusted. Therefore, the exhaust gas recirculation circuit is operated under the driving conditions of the internal combustion engine over a range wider than that of the eighth aspect of the present invention, so that the harmful component in the exhaust gas can be reduced.

According to a tenth aspect of the present invention, in the exhaust gas recirculation control apparatus for the internal combustion engine according to the fifth aspect of the present invention, there are provided: detecting means for detecting driving conditions of the internal combustion engine containing the EGR rate; storage means for previously storing a target EGR rate for the driving conditions of the internal combustion engine; and control means for controlling in such a manner that when the internal combustion engine is driven at a high speed under high loads, while the intake and exhaust bypass valve is substantially closed, the opening degree of the intake bypass valve is controlled so that the EGR rate of the internal combustion engine detected by the detecting means is equal to the target EGR rate and, when the internal combustion engine is driven at a medium speed under high loads, while the intake and exhaust bypass valve is substantially completely opened, the intake bypass valve is substantially closed.

According to the tenth aspect of the present invention, in addition to the fifth aspect of the present invention, during the driving at a high speed under high loads during which the intake flow rate is large, the effect of the narrow portion remarkably appears, and even if there is no flow in the intake and exhaust bypass, the circulation of the exhaust gas can be performed only by the above-mentioned effect of the narrow portion to reduce the pressure, the intake and exhaust bypass valve is closed, so that a reduction in charging efficiency of the intake air caused by the intake and exhaust bypass flow can be suppressed. Consequently, the fuel economy of the internal combustion engine during the driving at a high speed is improved. During the driving at a medium speed under high loads during which the intake flow rate is decreased and the effect of the narrow portion is deteriorated, the intake bypass valve is substantially closed and the total amount of the intake flow is supplied to the narrow portion to reduce the pressure in the narrow portion and, simultaneously, the intake and exhaust bypass valve is opened as much as possible to reduce the pressure in the intake circuit, so that the synergistic effect can be derived. Consequently, the EGR rate is raised to the maximum value and the $NO_X$ exhaust amount is suppressed to the minimum value. Further, the EGR rate is used as a controlled variable instead of the $NO_X$ exhaust amount, so that the expensive $NO_X$ detecting device is not needed and the cost can be reduced.

According to an eleventh aspect of the present invention, in the exhaust gas recirculation control apparatus of the present invention according to any one of the first to third, fifth to seventh, ninth, and tenth aspects, there are provided: a turbine bypass circuit for connecting the upstream side to the downstream side of the turbine of the turbocharger; and a waste gate valve which is opened to open the turbine bypass circuit when the pressure of an exhaust gas on the upstream side of the turbine is equal to or larger than a predetermined value.

According to the eleventh aspect of the present invention, in addition to any one of the first to tenth aspects of the present invention, the turbine bypass circuit for connecting the upstream side to the downstream side of the turbine of the turbocharger is provided. When the exhaust pressure on the upstream side of the turbine is equal to or larger than a predetermined value, the exhaust gas is let off from the turbine bypass circuit to the downstream side of the turbine. Consequently, a reduction in exhaust efficiency caused by an excessive rise in exhaust pressure on the turbine upstream side can be prevented and the fuel economy is improved.

According to a twelfth aspect of the present invention, in the exhaust gas recirculation control apparatus for the internal combustion engine according to the first, second, third, or fifth aspect of the present invention, the intake and exhaust bypass valve is formed between the downstream side of the compressor, upstream side of the turbine, and exhaust gas recirculation circuit, this valve is a three-way valve having a switching position where a port on the downstream side of the compressor is closed to connect the upstream side of the turbine to the exhaust gas recirculation circuit and a switching position where a port on the exhaust gas recirculation circuit side is closed to connect the downstream side of the compressor to the upstream side of the turbine, and an EGR cooler for cooling the exhaust gas is provided on the position of the exhaust gas recirculation circuit located on the more upstream side than a position where exhaust gas from the three-way valve joins.

According to the twelfth aspect of the present invention, there are formed two flows of the exhaust circulation such as exhaust flow directly circulated from the exhaust gas recirculation circuit and exhaust flow circulated through the three-way valve. The exhaust gas directly recirculated from the exhaust gas circulation circuit is cooled by the EGR cooler and the exhaust gas circulated through the three-way valve is not cooled. On the basis of such a fact, a ratio of the flow rates of the two exhaust circulation flows is adjusted, so that a temperature of the exhaust gas to be circulated to the intake circuit can be controlled. Consequently, improving the combustion state can reduce the exhausted harmful matter. Simultaneously, the exhaust flow rate passing through the EGR cooler is suppressed, so that the amount of heat to be absorbed from the EGR cooler to the car body can be minimized. Consequently, improving the heat balance can reduce burdens on the cooling system.

According to a thirteenth aspect of the present invention, in the exhaust gas recirculation control apparatus for the internal combustion engine according to the twelfth aspect of the present invention, during starting warming-up and driving under low loads of the internal combustion engine, the three-way valve closes the port on the downstream side of the compressor to connect the upstream side of the turbine to the exhaust gas recirculation circuit and, during the other driving conditions of the internal combustion engine, the three-way valve closes the port on the exhaust gas recirculation circuit side to connect the downstream side of the compressor to the upstream side of the turbine.

According to the thirteenth aspect of the present invention, in addition to the twelfth aspect of the present invention, during starting warming-up and driving under low loads of the internal combustion engine, the three-way valve closes the port on the downstream side of the compressor to connect the upstream side of the turbine to the exhaust gas recirculation circuit, so that the exhaust gas which does not pass through the EGR cooler is circulated, the temperature of the whole circulated exhaust gas is raised, and the warming-up time is reduced. Since warming-up is performed more quickly, white smoke (its main component is hydrocarbon) generated during starting at a low temperature is reduced. In addition, the occurrence of condensate caused by overcooling the exhaust gas through the EGR cooler during driving under low loads can be prevented and, further, the exhaust flow rate passing through the EGR cooler is suppressed, so that the amount of heat to be absorbed from the EGR cooler to the car body can be minimized. Improving the heat balance can reduce the burdens on the cooling system.

According to a fourteenth aspect of the present invention, in the exhaust gas recirculation control apparatus for the internal combustion engine according to the first, second, third, or fifth aspect of the present invention, the intake and exhaust bypass valve is a check valve for permitting only flow of one direction from the downstream side of the compressor to the upstream side of the turbine.

According to the fourteenth aspect of the present invention, since the control for the flow direction of the intake and exhaust bypass circuit can be performed by the simple construction such as a check valve, the cost is reduced.

According to a fifteenth aspect of the present invention, in the exhaust gas recirculation control apparatus for the internal combustion engine according to the fourteenth aspect of the present invention, the intake and exhaust bypass circuit for connecting the downstream side of the compressor to the upstream side of the turbine of the turbocharger is provided between a compressor housing and a turbine housing of the turbocharger.

According to the fifteenth aspect of the present invention, in addition to the eleventh aspect of the present invention, since the pipe of the intake and exhaust bypass circuit is directly connected to the housing of the turbocharger, the intake and exhaust bypass circuit is assembled integrally with the turbocharger, so that the assembling and maintenance are improved. Since the pipe is shortened and the intake air easily flows into the exhaust circuit, the responsibility of the intake and exhaust bypass circuit is improved and the effect on reduction in pressure of the intake circuit is remarkably shown, so that the exhausted harmful matter is further reduced.

According to a sixteenth aspect of the present invention, in the exhaust gas recirculation control apparatus for the internal engine according to any one of the first to third, fifth to seventh, ninth, and tenth aspects of the present invention, the exhaust passage from the exhaust manifold of the internal combustion engine to the inlet of the turbine housing of the turbocharger is divided into a plurality of passages, and both of the exhaust gas recirculation circuit and the intake and exhaust bypass circuit are connected to at least one of the divided exhaust passages.

According to the sixteenth aspect of the present invention, in addition to the foregoing aspects of the present invention, a deterioration in exhaust efficiency due to exhaust interference between the cylinders can be prevented by dividing the exhaust passage. Only either one of the exhaust gas recirculation circuit and the intake and exhaust bypass circuit is not connected to arbitrary one of the divided exhaust passages. In other words, both of the exhaust gas recirculation circuit and the intake and exhaust bypass circuit are connected to the divided exhaust passage or both of them are not connected to it. If the exhaust gas recirculation circuit and the intake and exhaust bypass circuit are connected to the divided different exhaust passages, respectively, the connecting position is away from the other position, so that such an effect that the pressure of the exhaust gas is raised by the intake and exhaust bypass and the exhaust gas is easily circulated is deteriorated. According to the present invention, however, such a phenomenon can be prevented.

Further, since the flow rate of the exhaust gas discharged to the exhaust gas recirculation circuit is substantially equal to that of the exhaust gas supplied from the intake and exhaust bypass circuit, the flow rates of the exhaust gas sent from the divided exhaust passages to the turbine of the turbocharger denote substantially the same value. Consequently, also in the case of the divided exhaust passages, the circulation of the exhaust gas can be performed by the operation of the intake and exhaust bypass circuit and a reduction in efficiency of the turbocharger due to unbalance of the exhaust flow rates of the passages is avoided, so that a deterioration in fuel economy can be prevented.

According to a seventeenth aspect of the present invention, in the exhaust gas recirculation control apparatus for the internal combustion engine according to the sixteenth aspect of the present invention, the position of the exhaust passage to which the exhaust gas recirculation circuit is connected is located on the upstream side of a position where the intake and exhaust bypass circuit is connected to the passage.

According to the seventeenth aspect of the present invention, in addition to the sixteenth aspect of the present invention, in arbitrary one of the divided exhaust passages, the connecting position of the exhaust gas recirculation circuit is located on the upstream side of the connecting position of the intake and exhaust bypass circuit. Accordingly, such a phenomenon that a part of the intake air introduced from the intake and exhaust bypass circuit to the exhaust passage is returned to the intake circuit through the exhaust gas recirculation circuit can be prevented. Therefore, such a possibility that the operation to reduce the harmful matter in the exhaust gas is damaged by mixing the intake air to the exhaust gas recirculation circuit is eliminated.

According to an eighteenth aspect of the present invention, there is provided an exhaust gas recirculation control apparatus for an internal combustion engine, in which between an intake circuit and an exhaust circuit, a turbocharger and an exhaust gas recirculation circuit that is openable by exhaust gas recirculation switching valves are provided, comprising: a turbine bypass circuit for connecting the upstream side to the downstream side of the turbine of the turbocharger; a waste gate valve which can open or close said turbine bypass circuit and whose opening degree can be controlled; and control means for controlling the valve opening degree of the waste gate valve in accordance with the driving conditions of the internal combustion engine and the EGR rate.

According to a nineteenth aspect of the present invention, in the exhaust gas recirculation control apparatus for the internal combustion engine according to the eighteenth aspect of the present invention, there are provided: detecting means for detecting driving conditions of the internal combustion engine; detecting means for detecting the EGR rate; detecting means for detecting an intake flow rate; and storage means for previously storing a target intake flow rate for the driving conditions of the internal combustion state and the EGR rate, and the control for the waste gate valve by the control means is a control to adjust the valve opening degree of the waste gate valve so that a difference between the detected intake flow rate and the target intake flow rate stored by the storage means is equal to or less than a predetermined value.

According to the eighteenth aspect of the present invention, the control means controls the valve opening degree of the waste gate valve to control the rotational speed of the turbocharger, so that the intake flow rate can be adjusted. Further, according to the nineteenth aspect of the present invention, when the circulation amount of the exhaust gas is fluctuated, the intake flow rate is adjusted to enable the flow rate of fresh air introduced to the engine main body (namely, only the fresh intake flow rate except for the circulation amount of the exhaust gas) to be held substantially constant, so that a fluctuation in amount of combustible fresh air for combustion can be suppressed. Consequently, there is no fluctuation in rotational speed of the engine and smoother driving can be realized.

According to a twentieth aspect of the present invention, in the exhaust gas recirculation control apparatus for the internal combustion engine according to the eighteenth or nineteenth aspect of the present invention, there are provided: an intake and exhaust bypass circuit for connecting the downstream side of the compressor to the upstream side of the turbine of the turbocharger; and an intake and exhaust bypass valve whose opening area can be varied so that the intake and exhaust bypass circuit can be opened or closed.

According to the twentieth aspect of the present invention, in addition to the eighteenth or nineteenth aspect of the present invention, a part of the intake air is allowed to flow into the exhaust circuit through the intake and exhaust bypass circuit to raise the pressure in the exhaust manifold and, simultaneously, the valve opening degree of the waste gate valve is controlled to adjust the intake flow rate and reduce the pressure in the intake manifold. Consequently, even under such driving conditions that since the pressure in the intake circuit is higher than that in the exhaust circuit, the circulation of the exhaust gas cannot be performed, the pressure in the intake manifold is reduced so as to be lower than that in the exhaust manifold, so that the circulation of the exhaust gas can be performed. Therefore, under the driving conditions of a wide range from a low-speed and low-load area to a high-speed and high-load area, the exhaust gas recirculation circuit is operated and the harmful component in the exhaust gas can be reduced.

Further, since the valve opening degree of the intake and exhaust bypass valve can be controlled in correspondence to the driving conditions of the internal combustion engine, even under such use that the driving conditions of the internal combustion engine such as rotational speed and loads are changed momently, the exhaust gas recirculation circuit is controlled so that the exhaust amount of $NO_X$ is approximate to a target value, so that a fine control to reduce the exhaust amount of $NO_X$ can be performed.

According to a twenty-first aspect of the present invention, in the exhaust gas recirculation control apparatus for the internal combustion engine according to the eighteenth or nineteenth aspect of the present invention, there are provided: an intake and exhaust bypass circuit for connecting the downstream side of the compressor to the upstream side of the turbine of the turbocharger; and a check valve for permitting the flow in the intake and exhaust bypass circuit only in one direction from the downstream side of the compressor to the upstream side of the turbine.

According to the twenty-first aspect of the present invention, in addition to the eighteenth or nineteenth aspect of the present invention, a part of the intake air is allowed to flow into the exhaust circuit through the intake and exhaust bypass circuit to raise the pressure in the exhaust manifold and, simultaneously, the valve opening degree of the waste gate valve is controlled to adjust the intake flow rate and reduce the pressure in the intake manifold. Consequently, even under such driving conditions that since the pressure in the intake circuit is higher than that in the exhaust circuit, the circulation of the exhaust gas cannot be performed, the pressure in the intake manifold is reduced so as to be lower than that in the exhaust manifold, so that the circulation of the exhaust gas can be performed. Therefore, under the driving conditions of a wide range from a low-speed and low-load area to a high-speed and high-load area, the exhaust gas recirculation circuit is operated and the harmful component in the exhaust gas can be reduced. Since the control for the flow direction control of the intake and exhaust bypass circuit can be performed by the simple construction such as a check valve, the manufacturing cost can be reduced.

According to a twenty-second aspect of the present invention, in the exhaust gas recirculation control apparatus for the internal combustion engine according to the eighteenth or nineteenth aspect of the present invention, a narrow portion is formed on the position of the intake circuit to which the exhaust gas recirculation circuit is branchingly connected, an intake bypass circuit for bypassing the narrow portion, and an intake bypass valve whose opening area can be varied so that the intake bypass circuit can be opened or closed are provided.

According to the twenty-second aspect of the present invention, in addition to the above aspects of the present invention, the narrow portion provided for the intake circuit is combined to the intake bypass circuit to control the opening degree of the intake bypass valve, so that the pressure in the narrow portion can be reduced. The exhaust gas recirculation circuit is connected to the narrow portion to enable the recirculation of the exhaust gas even during the driving at a medium speed or a high speed in the high-load area, so that the $NO_X$ exhaust amount can be reduced while the low fuel economy is maintained.

According to a twenty-third aspect of the present invention, in the exhaust gas recirculation control apparatus for the internal combustion engine according to the eighteenth or nineteenth aspect of the present invention, there are provided: a generator, which is provided immediately on the downstream side of the waste gate valve, for allowing the pivotably engaged turbine to be rotated due to the pressure of the exhaust gas to generate electric power; a first converter for converting the electric power generated by the generator into a chargeable state; and a battery for charging the electric power generated by the generator through the first converter.

According to the twenty-third aspect of the present invention, in addition to the above-mentioned aspects of the present invention, since the generator, first converter, and battery are provided, for example, in the driving at a high speed under low loads or decelerating, the energy of the exhaust gas passing through the waste gate valve is collected as electric energy by the generator, and the energy of the exhaust gas can be effectively used.

According to a twenty-fourth aspect of the present invention, in the exhaust gas recirculation control apparatus for the internal combustion engine according to the twenty-third aspect of the present invention, there are provided: an electric motor, which is rotated by the electric power from the battery, for promoting the driving of the turbocharger; and a second converter for converting the electric power from the battery into such a state that it can be driven and supplying the converted power to the electric motor.

According to the twenty-fourth aspect of the present invention, in addition to the twenty-third aspect of the present invention, since the second converter and electric motor are provided, for example, in the driving at a high speed under low loads or accelerating, the electric motor uses the electric energy charged in the battery to promote the turbocharger, so that the responsibility can be improved, and the supercharging pressure can be raised. Consequently, while the energy of the exhaust gas is effectively used, the improvement of accelerating properties due to a reduction in turbo lag, and a reduction in smoke and an increase in low-speed torque due to an increase in intake flow rate can be realized.

DETAILED DESCRIPTION OF THE PREFERRED EMBODIMENTS

Figure 1:
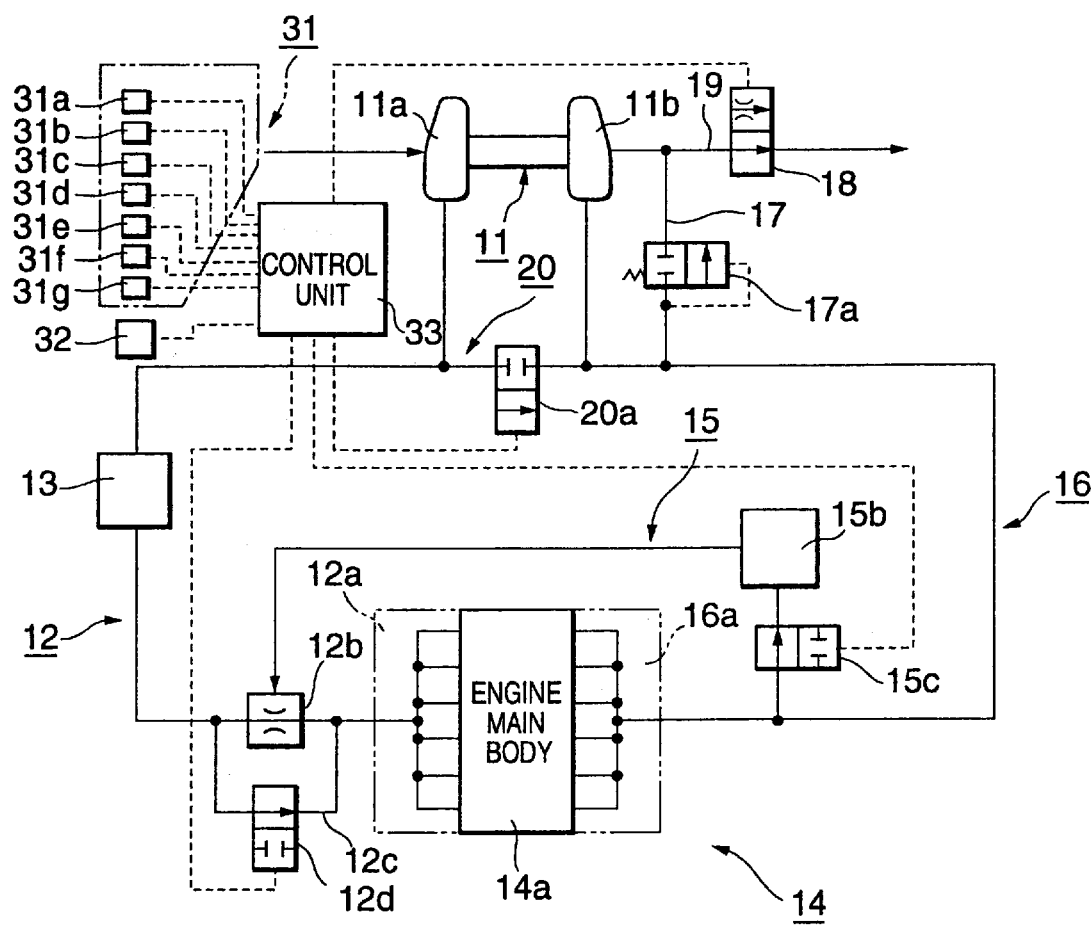
FIG. 1 is an intake and exhaust circuit diagram of a first embodiment according to an exhaust gas recirculation control apparatus for an internal combustion engine of the present invention.

A first embodiment of the present invention will now be described hereinbelow with reference to FIG. 1. The same components as those described in the prior art are designated by the same reference numerals and the descriptions are omitted.

In the engine 14 with the turbocharger having the exhaust gas recirculation control apparatus, a venturi 12b in which a narrow portion is formed is provided on the upstream side of the intake manifold 12a of the intake circuit 12. The exhaust gas recirculation circuit 15 is connected to the intake circuit 12 so as to join at the narrow portion of the venturi 12b. An intake bypass circuit 12c for connecting a portion located on immediately the upstream side of the venturi 12b to a portion located on immediately the downstream side is provided therebetween. An intake bypass valve 12d capable of opening or closing the intake bypass circuit 12c is provided for the circuit 12c.

Between the vicinity of the outlet of the compressor 11a of the intake circuit 12 and the vicinity of an inlet of the turbine 11b of the exhaust circuit 16, an intake and exhaust bypass circuit 20 for connecting them is provided. An intake and exhaust bypass valve 20a capable of opening or closing the intake and exhaust bypass circuit 20 is provided for the circuit 20.

Between the exhaust circuit 16 and a path 19 located between the outlet of the turbine 11b and the exhaust pressure control valve 18, a turbine bypass circuit 17 for connecting them is provided.

A waste gate valve 17a is provided for the turbine bypass circuit 17. When the pressure in the exhaust circuit 16 is equal to or larger than a predetermined value, the valve is opened and the gas is let off to the foregoing path 19, thereby reducing the pressure in the exhaust circuit 16. Since an excessive rise in pressure in the exhaust circuit 16 causes a decrease in efficiency of the engine 14 to deteriorate the fuel economy, the valve 17a prevents such a phenomenon.

The engine 14 comprises detecting means 31 for detecting the driving conditions of the engine 14, such as a rotational speed sensor 31a for detecting the rotational speed of the engine 14, a temperature sensor 31b for detecting a temperature of cooling water; a potentiometer 31c for detecting a throttle operation amount, a pressure sensor 31d for detecting a pressure in each pipe, an $NO_X$ sensor 31e for detecting an $NO_X$ exhaust amount, an air flow meter 31f for detecting an intake flow rate to be introduced to the engine main body 14a, and a temperature sensor 31g for detecting a temperature of the outlet of the EGR cooler 15b.

The engine 14 also comprises: storage means 32 for storing as a control map the $NO_X$ exhaust amount serving as a target value determined every combination of the rotational speed and the throttle operation amount; and a control unit 33 for controlling the opening degree of each of the intake bypass valve 12d, EGR valve 15c, exhaust pressure control valve 18, and intake and exhaust bypass valve 20a so as to allow the detected $NO_X$ exhaust amount and intake flow rate to be approximated to the target values and improve the fuel economy in response to received signals from the detecting means 31 and the storage means 32.

Figure 2:
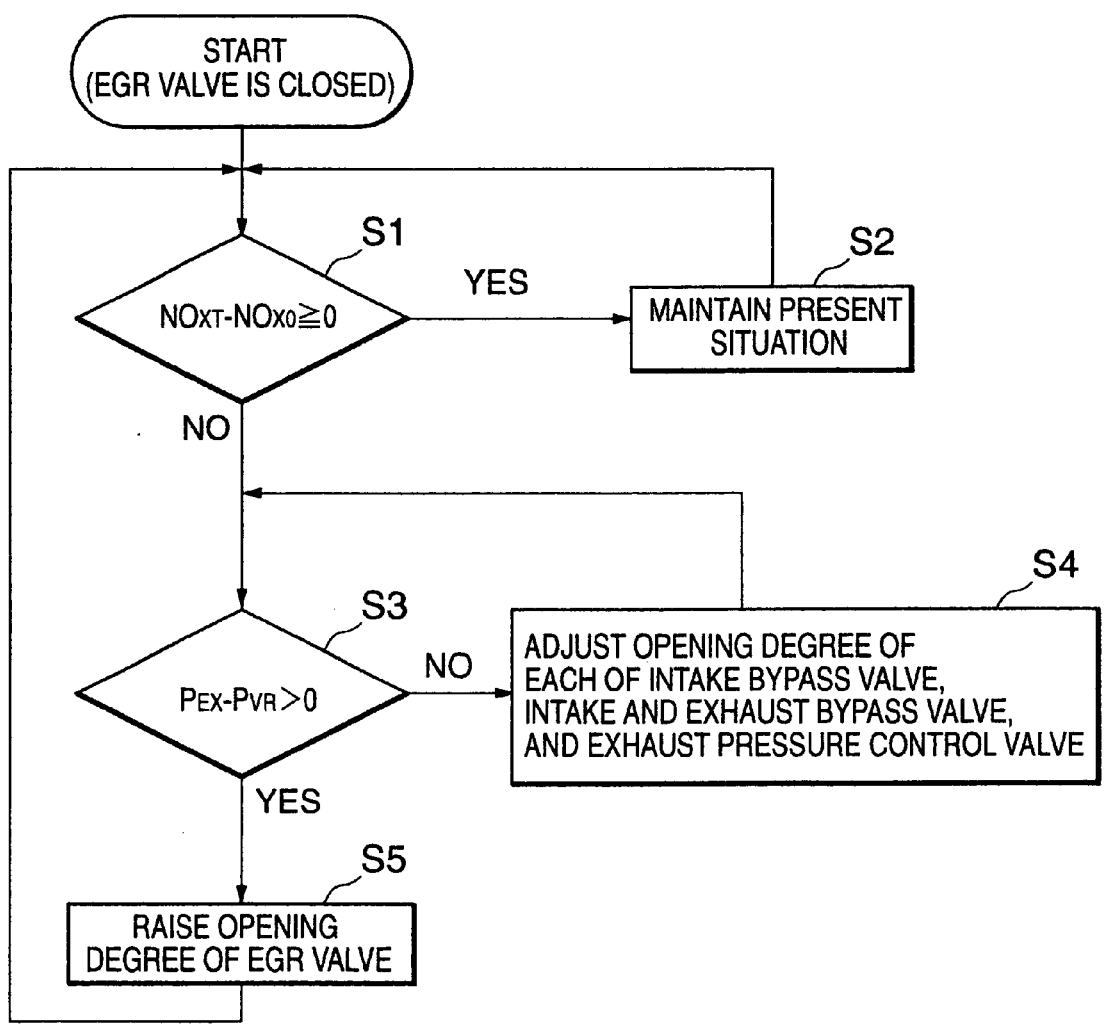
FIG. 2 is a control flowchart of control valves in the first embodiment.

A control flowchart of the valves in the first embodiment will now be described with reference to FIG. 2. In the initial state, the EGR valve 15c and the intake and exhaust bypass valve 20a are closed and the intake bypass valve 12d is completely opened. First in step S1, the control unit 33 compares an $NO_X$ exhaust amount $NO_{XO}$ detected by the $NO_X$ sensor 31e with an $NO_X$ exhaust amount $NO_{XT}$ selected on the control map stored by the storage means 32 on the basis of the rotational speed detected by the rotational speed sensor 31a and the throttle operation amount detected by the potentiometer 31c. When an expression of $NO_{XT}-NO_{XO} \geq 0$ is true, the opening degree of each valve is kept as it is in step S2, the processing routine is returned to step S1, and the process is repeated. When the expression of $NO_{XT}-NO_{XO} \geq 0$ is false, namely, when it is determined that the $NO_X$ exhaust amount $NO_{XO}$ detected by the $NO_X$ sensor 31e is in excess, step S3 follows and the control unit 33 executes the control regarding the exhaust gas recirculation. In other words, the control unit 33 compares a pressure $P_{VR}$ of the narrow portion of the venturi 12b detected by the pressure sensor 31d with a pressure $P_{EX}$ in the exhaust manifold 16a. When an expression of $P_{EX}-P_{VR}>0$ is true, in step S5, an opening amount of the EGR valve 15c is increased by a predetermined value. Step S1 follows and the above-mentioned processes are repeated.

In step S3, when the expression of $P_{EX}-P_{VR}>0$ is false, even if the EGR valve 15c is opened, exhaust gas recirculation cannot be performed. In step S4, the control unit 33 adjusts the opening degree of each of the intake bypass valve 12d, exhaust pressure control valve 18, and intake and exhaust bypass valve 20a so that the expression of $P_{EX}-P_{VR}>0$ comes true. The valves have the following effects.

When the intake bypass valve 12d is throttled, the flow rate passing through the intake bypass circuit 12c is reduced and the flow rate passing through the venturi 12b is increased as much as the above reduction amount, so that the flow velocity in the narrow portion is increased to reduce $P_{VR}$. When the exhaust pressure control valve 18 is throttled, $P_{EX}$ is raised as mentioned above. When the intake and exhaust bypass valve 20a is opened, a part of the intake air compressed by the compressor 11a flows into the exhaust circuit 16 through the intake and exhaust bypass circuit 20, so that $P_{VR}$ is reduced and $P_{EX}$ is raised. The control unit 33 repeats the processes in steps S3 and S4 until the expression of $P_{EX}-P_{VR}>0$ becomes true, and step S5 follows. Further, the processing routine is returned to step S1 and the processes of steps S3, S4, and S5 are repeated so that the expression of $NO_{XT}-NO_{XO} \geqq 0$ comes true.

The effect of each of the above intake bypass valve 12d, exhaust pressure control valve 18, and intake and exhaust bypass valve 20a accompanies with such a side effect that the efficiency of the engine 14 is reduced and the fuel economy is deteriorated. When the intake bypass valve 12d is throttled, the passing flow rate of the venturi 12b increases as much as the throttled amount, so that intake resistance increases due to the passing resistance of the venturi 12b. When the exhaust pressure control valve 18 is throttled, the outlet pressure of the turbine 11b is raised as mentioned above, so that the exhaust efficiency of the engine 14 is deteriorated. When the intake and exhaust bypass valve 20a is opened, a part of the intake air flows into the exhaust circuit 16, so that the pressure of the intake air is decreased and charging efficiency of the intake air is deteriorated.

Accordingly, in order to raise $P_{EX}$ and reduce $P_{VR}$ to minimize a deterioration in fuel economy due to the above side effect and, simultaneously, set the expression of $P_{EX}-P_{VR} \geqq 0$ to be true, it is desirable that the control unit 33 control the opening degrees of the valves so as to be balanced in such a manner that the intake bypass valve 12d and the exhaust pressure control valve 18 are opened as much as possible to reduce the resistance and the intake and exhaust bypass valve 20a is throttled as much as possible to suppress the loss of the intake air.

Particularly, when the following control characteristics are set during driving at a high speed under high loads and diving at a medium speed under high loads, it is effective in reducing the $NO_X$ exhaust amount while suppressing a deterioration in fuel economy.

First, because the intake flow rate is relatively high during the driving at a high speed under high loads, even when the intake bypass valve 12d is opened, the intake air of a flow rate enough to reduce $P_{VR}$ flows into the venturi 12b. When the intake and exhaust bypass valve 20a is closed, the expression of $P_{EX}-P_{VR}>0$ can be set to be true. Therefore, only during the driving at a high speed under high loads, while the exhaust bypass valve 20a is completely closed, the opening degrees of the intake bypass valve 12d and the exhaust pressure control valve 18 are adjusted. Consequently, during the driving at a high speed under high loads, a deterioration in fuel economy is minimized and the $NO_X$ exhaust amount can be reduced so that the expression of $NO_{XT}-NOXO \geqq 0$ becomes true.

During driving at a medium speed under high loads, since the turbocharger 11 is designed so that the pressure on the intake side is especially higher than that on the exhaust side in many cases and the intake flow rate is relatively small, it is difficult to satisfy the expression of $P_{EX}-P_{VR}>0$. Accordingly, the following control is performed. That is, the intake and exhaust bypass valve 20a is completely opened and, while the pressure of the intake manifold 12a is being reduced as much as possible and the pressure $P_{EX}$ in the exhaust manifold 16a is being raised to the maximum value, the intake bypass valve 12d is completely closed and the total amount of the intake air is allowed to pass through the venturi 12b, so that $P_{VR}$ is reduced to the minimum value. The expression of $P_{EX}-P_{VR}>0$ is satisfied by the synergistic effect, so that the $NO_X$ exhaust amount can be reduced so that the expression of $NO_{XT}-NO_{XO}>0$ comes true.

There is a method of detecting and comparing the EGR rate instead of the $NO_X$ exhaust amount to control the $NO_X$ exhaust amount.

When the driving conditions are determined, an EGR rate $EGR_T$ corresponding to the $NO_X$ exhaust amount $NO_{XT}$ as a target is unconditionally determined. Therefore, the EGR rate $EGR_T$ serving as a target value determined every combination of the rotational speed and the throttle operation amount is stored as a control map in the storage means 32. On the other hand, an actual EGR rate $EGR_O$ is obtained as follows. A proportional constant c determined by an exhaust temperature detected by the EGR cooler outlet temperature sensor 31g and a sectional area A of the passage are multiplied to the square root of a differential pressure between $P_{EX}$ and $P_{VR}$ detected by the pressure sensor 31d to obtain an EGR amount $Q_{EGR}$. The EGR amount $Q_{EGR}$ is divided by the sum of an intake flow rate $Q_A$ detected by the air flow meter 31f and the EGR quantity $Q_{EBR}$, thereby obtaining $EGR_O$. That is, it is obtained by the following equations.

$$Q_{EGR}=c \times A \times (P_{EX}-P_{VR})^{1/2}$$

$$EGR_O=Q_{EGR}/(Q_A+Q_{EGR})$$

The control unit 33 compares the actual EGR rate $EGR_O$ obtained by the above equations on the basis of the differential pressure between $P_{EX}$ and $P_{VR}$ detected by the pressure sensor 31d and the intake flow rate $Q_A$ detected by the air flow meter 31f with the target EGR rate $EGR_T$ selected on the control map stored by the storage means 32 on the basis of the rotational speed detected by the rotational speed sensor 31a and the throttle operation amount detected by the potentiometer 31c.

After that, the control unit 33 adjusts the opening degree of the EGR valve 15c so that the expression of $EGR_T-EGR_O \geqq 0$ is true in step S1. Consequently, the same effect as those derived by controlling so that the expression of $NO_{XT}-NO_{XO} \geqq 0$ is satisfied in step S1 is obtained.

According to the method of controlling on the basis of the EGR rate, it is unnecessary to directly detect the $NO_X$ exhaust amount. Accordingly, since the expensive $NO_X$ sensor 31e is not needed, the cost can be reduced.

Figure 3:
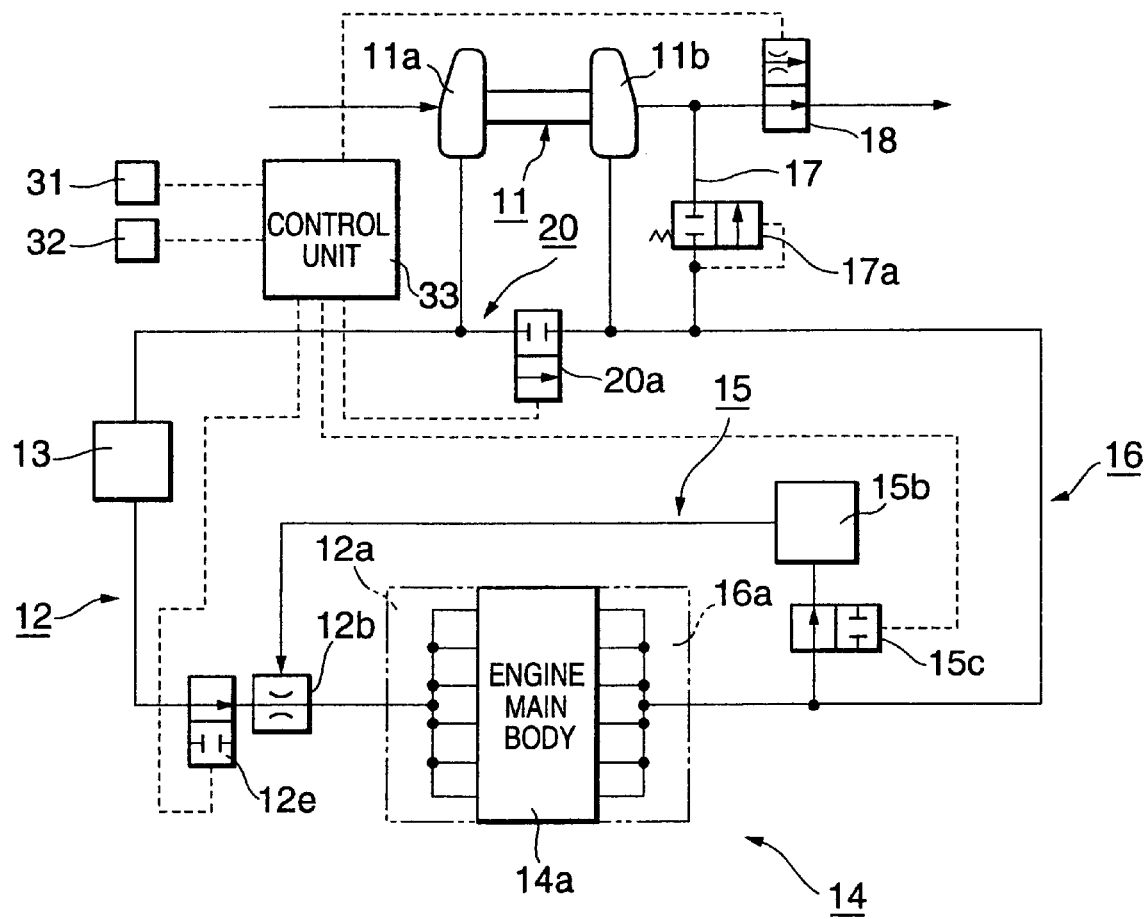
FIG. 3 is a diagram of an intake and exhaust circuit of a second embodiment according to the present invention.

A second embodiment of the present invention will now be described with reference to FIG. 3. it differs from the first embodiment with respect to such a point that the intake bypass circuit 12c is not provided and an intake throttle valve 12e is provided in place of it immediately on the upstream side of the venturi 12b. The control flowchart of the valves in the present second embodiment can be described in such a manner that the control of the intake bypass valve 12d in the flowchart of FIG. 2 referred in the first embodiment is changed to the control of the intake throttle valve 12e. In other words, when the expression of $P_{EX}-P_{VR}>0$ is false in step S3, in accordance with the instruction in step S4, the control unit 33 throttles the intake throttle valve 12e to apply the intake resistance, $P_{VR}$ is lowered, the expression of $P_{EX}-P_{VR}>0$ in step S3 comes true, and the circulation of the exhaust gas can be performed. When the intake throttle valve 12e is throttled, however, such a side effect that the intake resistance increases to deteriorate the fuel economy is also derived. Accordingly, desirably, in order to raise $P_{EX}$ and reduce $P_{VR}$ so as to set the expression of $P_{EX}-P_{VR}>0$ to be true in step S3 while suppressing the deterioration in fuel economy to the minimum value, in step S4, the control unit 33 controls the opening degree of each valve so that the intake throttle valve 12e and the exhaust pressure control valve 18 are opened as much as possible to reduce the resistance and the intake and exhaust bypass valve 20a is throttled as much as possible to suppress the loss of the intake air while balancing the opening degrees.

The method of controlling the valves so that the $NO_X$ exhaust amount or EGR rate is equal to the target value, which has been described in the first embodiment, can be also applied to the present second embodiment by substituting the control of the intake throttle valve 12e for the control of the intake bypass valve 12d.

Figure 4:
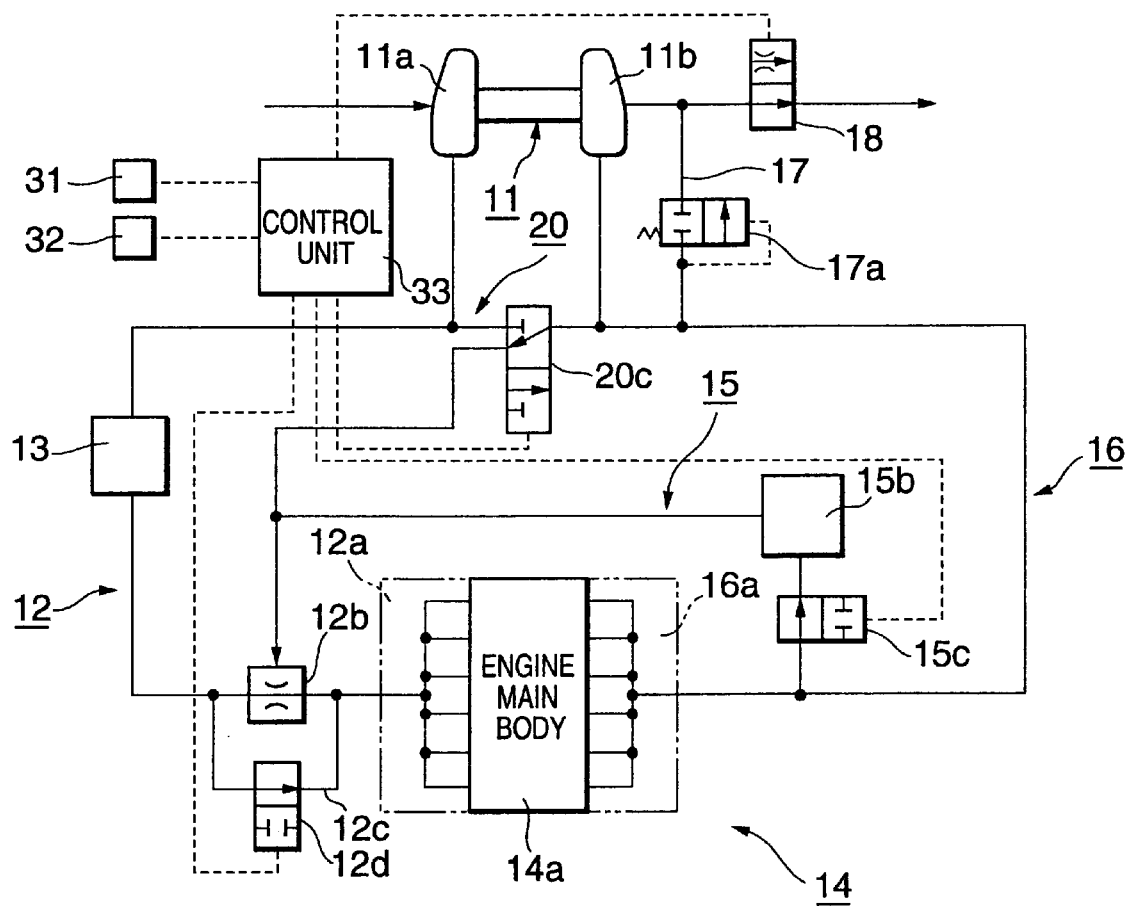
FIG. 4 is a diagram of an intake and exhaust circuit diagram of a third embodiment according to the present invention.

A third embodiment of the present invention will now be described with reference to FIG. 4. It differs from the first embodiment with respect to such a point that a three-way valve 20c is provided in the intake and exhaust bypass circuit 20 in place of the intake and exhaust bypass valve 20a. Three ports of the three-way valve 20c are connected to the intake circuit 12, exhaust circuit 16, and exhaust gas recirculation circuit 15, respectively. The three-way valve 20c has two switching positions. On one of the switching positions, the intake circuit 12 is connected to the exhaust circuit 16 and, on the other one, the exhaust circuit 16 is connected to the exhaust gas recirculation circuit 15. The passage from the three-way valve 20c joins with the exhaust gas recirculation circuit 15 on the downstream side of the EGR cooler 15b. A control flowchart of the valves in the third embodiment can be explained by substituting the control of the three-way valve 20c for the control of the intake and exhaust bypass valve 20a in the flowchart of FIG. 2 referred in the first embodiment. In other words, when the expression of $P_{EX}-P_{VR}>0$ is false in step S3, the control unit 33 switches the three-way valve 20c to one of the switching positions in accordance with the instruction. Since the intake circuit 12 is connected to the exhaust circuit 16, a part of the intake air compressed by the compressor 11a flows into the exhaust circuit 16 through the intake and exhaust bypass circuit 20. Since the effects are the same as those in the case where the intake and exhaust bypass valve 20a is opened in the first embodiment, the description is omitted. When the expression of $P_{EX}-P_{VR}>0$ is true in step S3, in step S5, the control unit 33 increases the opening degree of the EGR valve 15c and switches the three-way valve 20c to the other switching position in accordance with the instruction. Since the exhaust circuit 16 is connected to the exhaust gas recirculation circuit 15, a part of the exhaust gas flows into the exhaust gas recirculation circuit 15 through the intake and exhaust bypass circuit 20. Since the exhaust gas flows into the exhaust gas recirculation circuit 15 on the downstream side of the EGR cooler 15b, it is circulated without being cooled. When the opening degree of the EGR valve 15c is adjusted, the temperature of the circulated exhaust gas can be adjusted by changing the mixture ratio of the exhaust gas passed through the EGR cooler 15b and the exhaust gas not to be passed through the EGR cooler 15b. Consequently, a temperature of intake air can be changed in accordance with the driving conditions so that the $NO_X$ exhaust amount can be reduced. Simultaneously, the exhaust flow rate to be passed through the EGR cooler 15b is suppressed, so that the amount of heat to be absorbed from the EGR cooler 15b to the car body can be minimized, heat balance is improved, and burdens on the cooling system can be reduced.

For example, in the case where it is cold, when such a control that the three-way valve 20c is switched to the other switching position and the EGR valve 15c is closed is performed, only the exhaust gas not to be passed through the EGR cooler 15b is circulated and a temperature of intake air of the engine 14 rises. Therefore, a warming-up time is reduced when the engine 14 is started in a cold district, so that the occurrence of white smoke can be suppressed. Further, overcooling of the engine 14 during the driving under low loads in the cold district can be prevented. Since the overcooling increases a frictional resistance of the engine 14 to deteriorate the fuel economy, the fuel economy can be improved by preventing the overcooling.

Figure 5A:
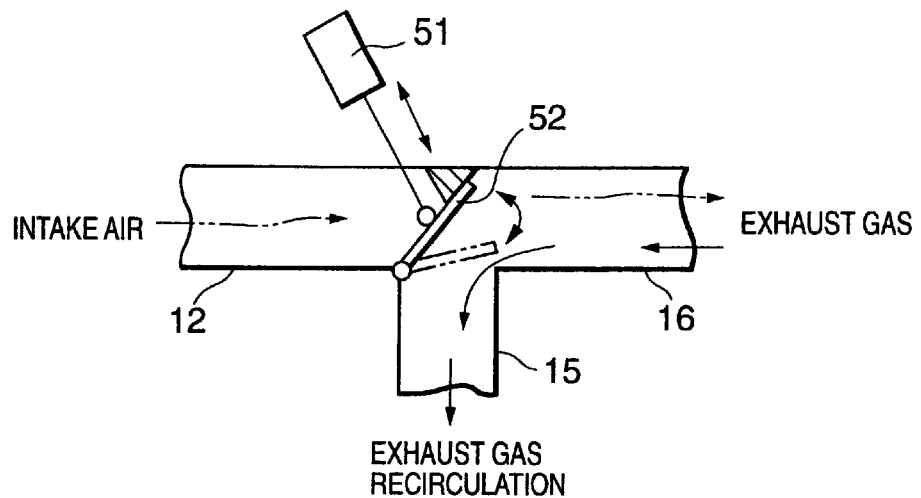
FIGS. 5A to 5C are cross sectional views of a three-way valve that is used in the third embodiment.
Figure 5B:
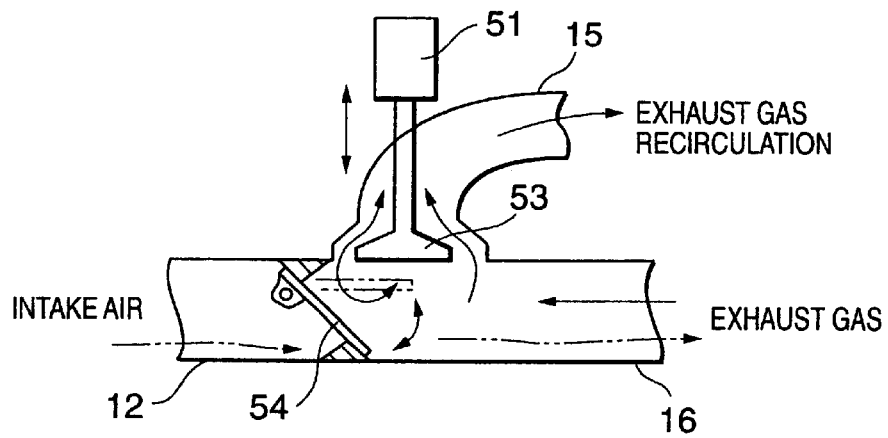
Figure 5C:
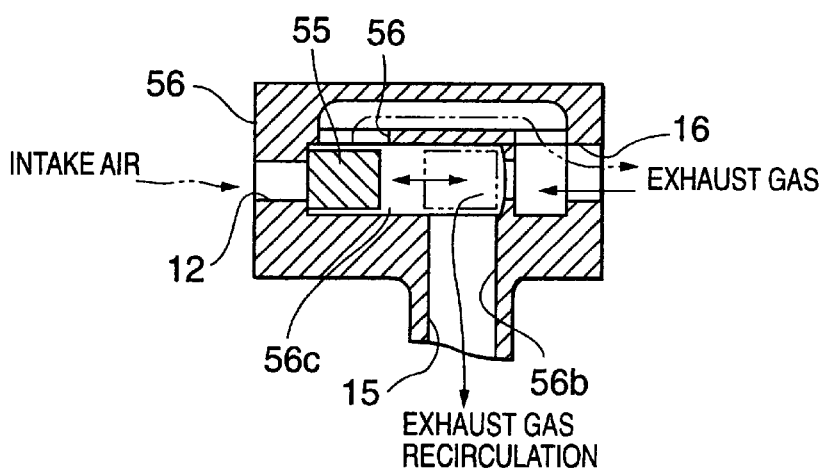

FIGS. 5A to 5C illustrate the structure of the three-way valve which is used in the third embodiment. FIG. 5A illustrates the valve in which a movable plate 52 is provided on a junction of the three ways and an actuator 51 such as a cylinder or a diaphragm is coupled to the plate. The actuator 51 drives the plate 52 to switch the valve to a first position where the passage connected to the intake circuit 12 is closed to connect the exhaust circuit 16 to the exhaust gas recirculation circuit 15 or to a second position where the passage to the exhaust gas recirculation circuit 15 is closed to connect the intake circuit 12 to the exhaust circuit 16.

FIG. 5B illustrates the valve in which a movable plate 54 and a poppet 53 are provided on the junction of the three ways and the actuator 51 such as a cylinder or a diaphragm is coupled to the poppet 53. The actuator 51 drives the poppet 53 to allow the passage connected to the exhaust gas recirculation circuit 15 to be openable. The plate 54 is provided on the passage connected to the intake circuit 12 on the junction of the three ways. A rotating shaft movably supports the upper portion. When the pressure in the intake circuit 12 is higher than that in the exhaust circuit 16, the plate is pressed upwardly and opened to release the passage. When the pressure in the intake circuit 12 is lower than that in the exhaust circuit 16, it is returned downwardly to close the passage. Since the upper portion of the plate 54 is movably supported, the force to return downwardly due to the self-weight always operates, so that the passage is surely closed. When the expression of $P_{EX}-P_{VR}>0$ is false, the poppet 53 closes the passage connected to the exhaust gas recirculation circuit 15 by the actuator 51. In this case, since the pressure in the intake circuit 12 is higher than that in the exhaust circuit 16, the plate 54 opens the passage to allow a part of intake air to flow into the exhaust circuit 16. When the expression of $P_{EX}-P_{VR}>0$ is true, the poppet 53 opens the passage connected to the exhaust gas recirculation circuit 15 by the actuator 51. In this case, since the pressure in the intake circuit 12 is lower than that in the exhaust circuit 16, the plate 54 closes the passage connected to the intake circuit 12. Consequently, the exhaust gas shut by the plate 54 passes through the poppet 53 and flows into the exhaust gas recirculation circuit 15.

FIG. 5C shows the valve in which a piston 55 slides in a housing 56 to switch the passage. The housing 56 has a sliding chamber 56c containing the sliding piston 55. On the internal surface of the sliding chamber 56c, a hole 56a for connecting the intake circuit 12 to the exhaust circuit 16 and a hole 56b for connecting the exhaust circuit 16 and the exhaust gas recirculation circuit 15 are formed. When the pressure in the intake circuit 12 is higher than that in the exhaust circuit 16, the piston 55 slides to open the hole 56a and close the hole 56b. Consequently, a part of the intake air flows into the exhaust circuit 16 through the housing 56. When the pressure in the exhaust circuit 16 is higher than that in the intake circuit 12, the piston 55 slides to open the hole 56b and close the hole 56a. Accordingly, a part of the exhaust gas flows into the exhaust gas recirculation circuit 15 through the housing 56. Since the piston 55 moves in accordance with the magnitude of the pressure to switch the passage, the structure is different from the above-mentioned two structures and the actuator 51 is not needed. The structure of the three-way valve 20c is not limited to the illustrated three examples.

Figure 6:
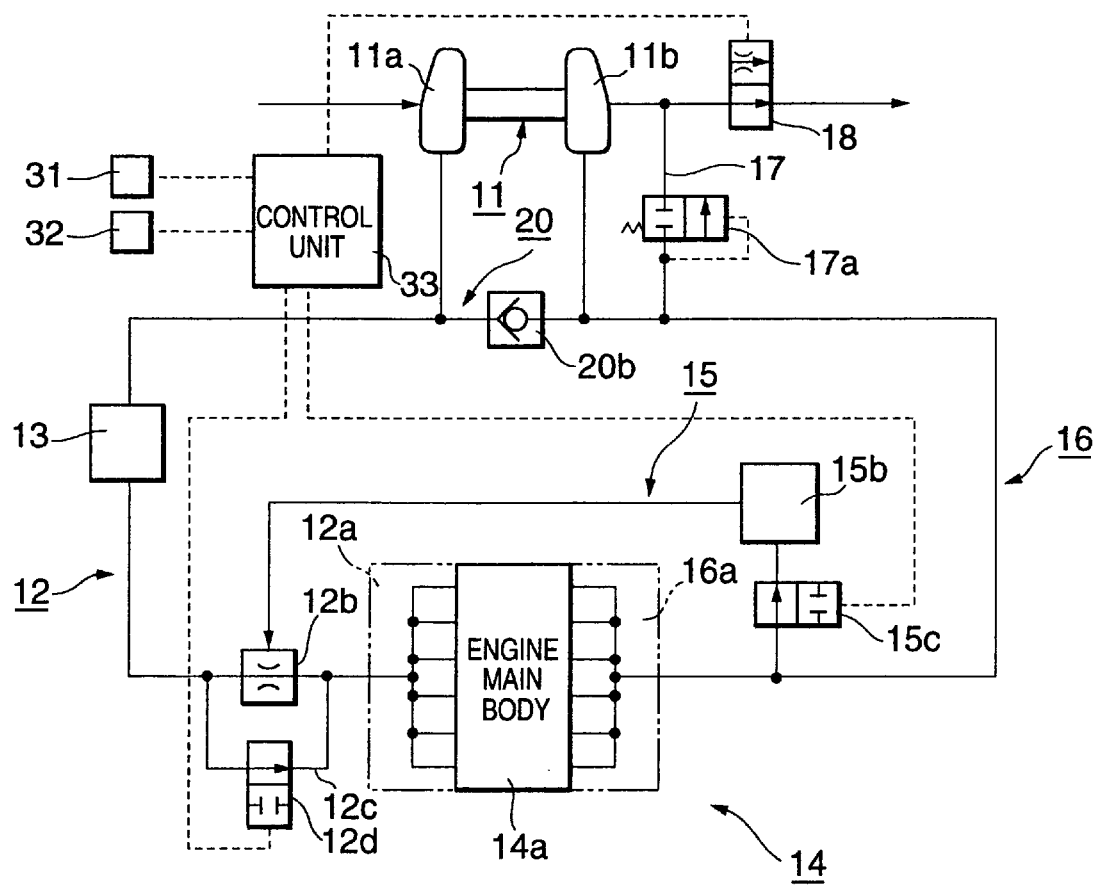
FIG. 6 is an intake and exhaust circuit diagram of a fourth embodiment of the present invention.

A fourth embodiment of the present invention will now be described with reference to FIG. 6. It differs from the first embodiment with respect to such a point that a check valve 20b is provided in place of the intake and exhaust bypass valve 20a for the intake and exhaust bypass circuit 20. The check valve 20b permits only the flow in one direction from the intake circuit 12 to the exhaust circuit 16. A control flowchart of the valves in the present fourth embodiment can be described by substituting the control of the check valve 20b for the control of the intake and exhaust bypass valve 20a in the flowchart of FIG. 2 referred in the paragraph for the first embodiment. That is, when the expression of $P_{EX}-P_{VR}>0$ is true in step S3, since the pressure in the exhaust circuit 16 is higher than that in the intake circuit 12, a part of the exhaust gas passes through the exhaust gas recirculation circuit 15 and circulated. At that time, the check valve 20b is closed, thereby closing the intake and exhaust bypass circuit 20. When the expression of $P_{EX}-P_{VR}>0$ is false in step S3, since the pressure in the intake circuit 12 is higher than that in the exhaust circuit 16, a part of the intake air flows into the exhaust circuit 16 via the check valve 20b, so that each pressure is controlled in step S4 so that the expression of $P_{EX}-P_{VR}>0$ comes true in step S3 (refer to the first embodiment). When the check valve 20b is compared with the intake and exhaust bypass valve 20a and the three-way valve 20c, the control mechanism is not needed. Accordingly, the structure is simplified to realize a reduction in cost.

Figure 7A:
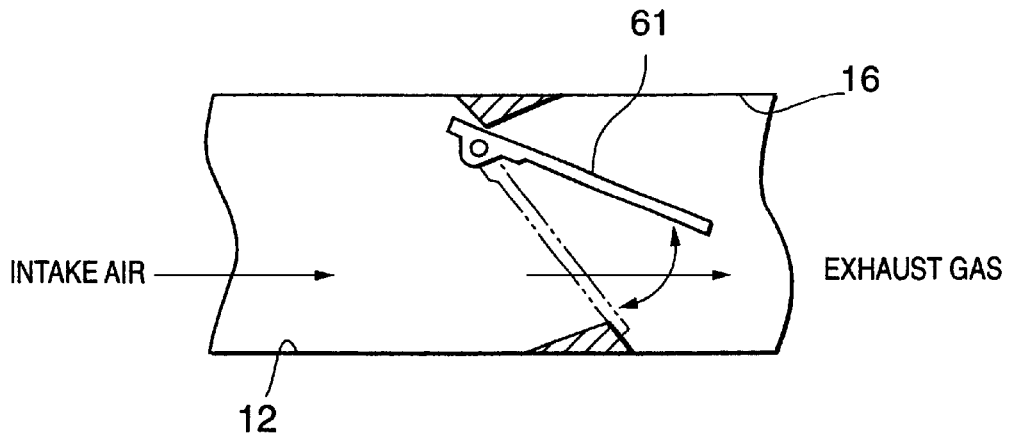
FIGS. 7A to 7C are cross sectional views of a check valve that is used in the fourth embodiment.
Figure 7B:
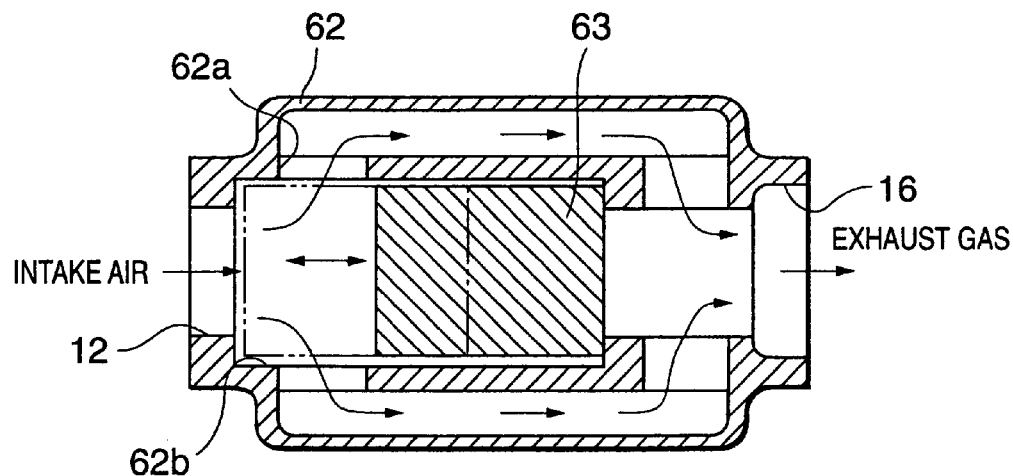
Figure 7C:
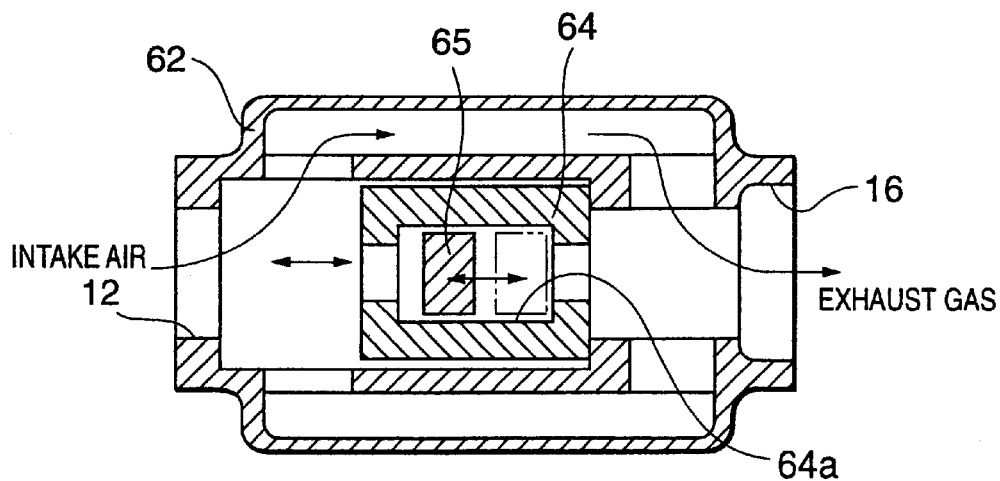

FIGS. 7A to 7C illustrate the structure of the check valve used in the fourth embodiment. FIG. 7A shows the valve in which a movable plate 61 is provided in the passage. A rotating shaft movably supports the upper portion of the plate 61. When the pressure in the intake circuit 12 is higher than that in the exhaust circuit 16, the plate 61 is pressed upwardly to open the passage. When the pressure in the intake circuit 12 is lower than that in the exhaust circuit 16, the plate is pressed downwardly and returned to close the passage. Since the upper portion of the plate 61 is movably supported, the force to return downwardly due to the self-weight always operates. Consequently, the passage is surely closed.

FIG. 7B shows the valve in which a piston 63 slides in a housing 62 to switch the passage. The housing 62 has a sliding chamber 62b containing the sliding piston 63. On the internal surface of the sliding chamber 62b, a hole 62a for connecting the intake circuit 12 to the exhaust circuit 16 is provided. When the pressure in the intake circuit 12 is higher than that in the exhaust circuit 16, the piston 63 slides to open the hole 62a. Accordingly, a part of the intake air flows into the exhaust circuit 16 through the housing 62. When the pressure in the exhaust circuit 16 is higher than that in the intake circuit 12, the piston 63 slides to close the hole 62a. Consequently, the intake and exhaust bypass circuit 20 is closed.

FIG. 7C shows the valve having such a structure that the piston is allowed to have a function to damp pressure pulsation in the structure of FIG. 7B. The piston 64 has a sliding chamber 64a therein, which contains a piston 65. Both the ends of the sliding chamber 64a are opened, one end is connected to the intake circuit 12, and the other end is connected to the exhaust circuit 16. The piston 65 slides in the piston 64 so that the peripheral surface thereof is substantially come into contact with the internal surface of the sliding chamber 64a. Since the piston 65 slides to change the volume of each of the intake circuit 12 and the exhaust circuit 16 as much as a sliding stroke thereof, it has such an effect that the pressure pulsation of each of the intake circuit 12 and the exhaust circuit 16 is absorbed and attenuated. Consequently, a high-frequency vibration and noises of the piston caused by the pressure pulsation can be reduced. The structure of the check valve 20b is not limited to the illustrated three examples.

Figure 8:
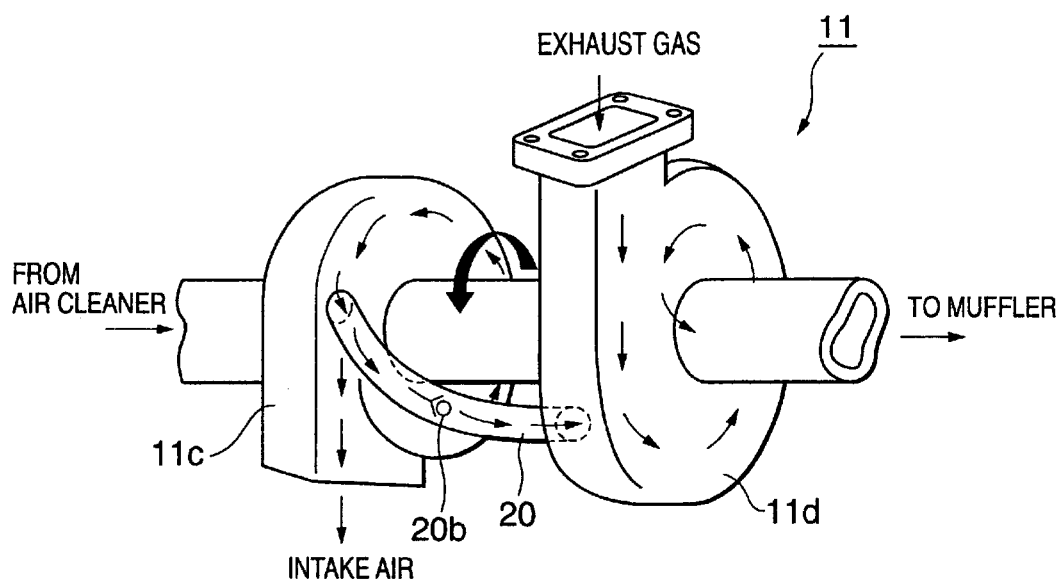
FIG. 8 is a perspective view of a turbocharger in which an intake and exhaust bypass valve is provided between a compressor housing and a turbine housing.

As mentioned above, when the check valve 20b is used to control the direction of the intake and exhaust bypass circuit 20, the structure can be simplified. Accordingly, as shown in FIG. 8, the intake and exhaust bypass circuit 20 can be easily connected to both of a compressor housing 11c and a turbine housing 11d of the turbocharger 11. Consequently, the apparatus can be compacted. In addition, since the turbocharger 11 and the intake and exhaust bypass circuit 20 can be integrally assembled, assembly property and maintainability can be improved.

Further, preferably, the pipe is connected so that it is arranged along the rotating direction of the compressor 11a and obliquely wrapped around the rotating shaft of the turbocharger 11. Accordingly, since the flow of the intake air obtained by the rotation of the compressor 11a is introduced to the pipe so that the direction is not changed as much as possible, the pipe can be shortened and, simultaneously, a pipe resistance can be reduced. Consequently, the response of the intake and exhaust bypass circuit 20 can be improved. When the response of the intake and exhaust bypass circuit 20 is improved, time lag until the pressure in the intake circuit 12 is decreased by the intake and exhaust bypass and the recirculation of the exhaust gas can be performed after the pressure in the intake circuit 12 is higher than that in the exhaust circuit 16 is shortened. Accordingly, since the recirculation of the exhaust gas is not performed during the time lag, the increasing $NO_X$ exhaust amount can be reduced.

Figure 9:
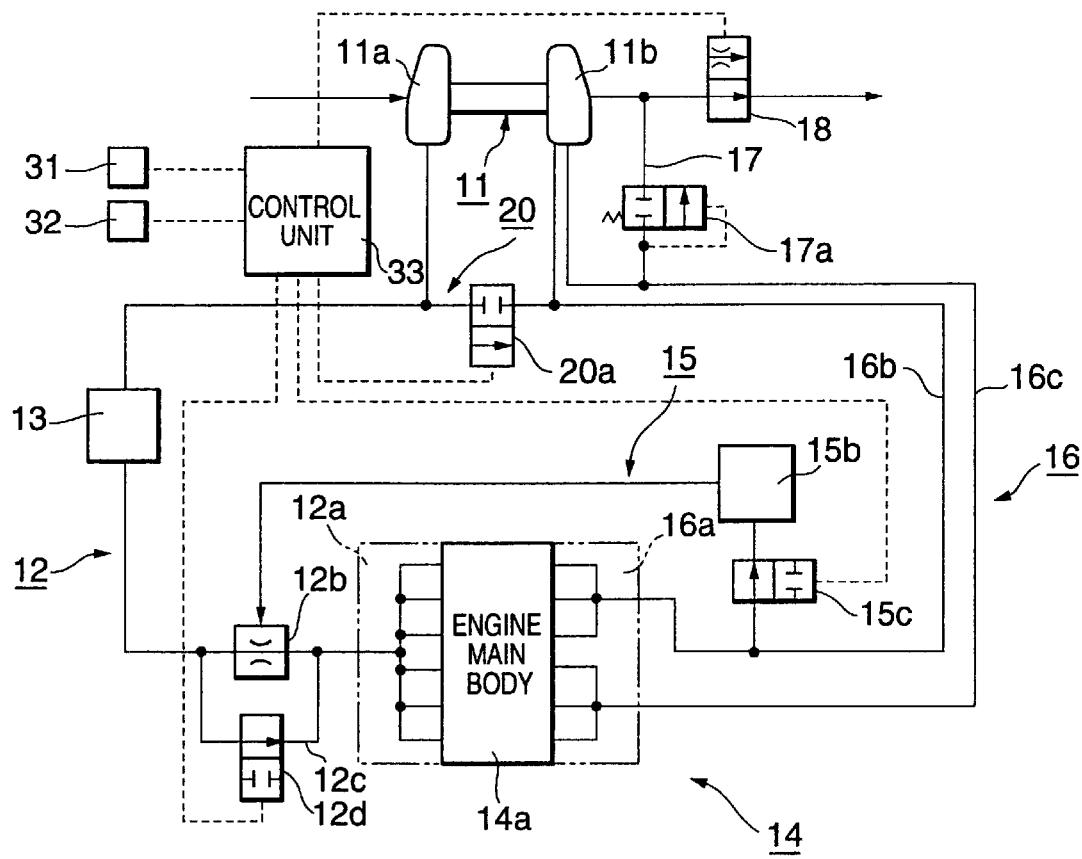
FIG. 9 is a diagram of an intake and exhaust circuit of a sixth embodiment according to the present invention.

A fifth embodiment of the present invention will now be described with reference to FIG. 9. It differs from the first embodiment with respect to such a point that the exhaust circuit 16 is divided into two passages 16b and 16c between the exhaust manifold 16a and the turbine 11b. A housing (not shown) of the turbine 11b has two-divided input ports to which the passages are connected. The purpose of dividing the exhaust passage into the two passages 16b and 16b is to avoid a deterioration in exhaust efficiency due to exhaust interference between the pipes. Both of the exhaust gas recirculation circuit 15 and the intake and exhaust bypass circuit 20 are connected to the exhaust passage 16b but both of them are not connected to the other exhaust passage 16c. If the exhaust gas recirculation circuit 15 is connected to the exhaust passage 16b and the intake and exhaust bypass circuit 20 is connected to the other exhaust passage 16c, the effect due to the intake and exhaust bypass, namely, such an effect that the pressure in the intake circuit 12 is reduced and the pressure in the exhaust passage 16b is raised to easily circulate the exhaust gas is weaken. The flow rate of the exhaust gas flowing into the exhaust passage 16b is reduced, the flow rate of the exhaust gas flowing into the other exhaust passage 16c is increased, and the exhaust gas flow rate of one passage is different from that of the other one. Consequently, the flow of the exhaust gas is out of balance at the inlet port of the housing of the turbine $11b$, the rotation of the turbocharger 11 comes unstable to deteriorate the efficiency, so that the fuel economy is deteriorated. Accordingly, each of the exhaust passages connects both of the exhaust gas recirculation circuit 15 and the intake and exhaust bypass circuit 20 or connects neither of them.

In this case, the exhaust gas recirculation circuit 15 is connected on the more upstream side of the exhaust passage $16b$ than the intake and exhaust bypass circuit 20, namely, connected on the side in the vicinity of the engine main body $14a$. The reason is that when the exhaust gas recirculation circuit 15 is connected on the more downstream side of the exhaust passage than the intake and exhaust bypass circuit 20, a part of the intake air introduced from the intake and exhaust bypass circuit 20 to the exhaust passage $16b$ enters the exhaust gas recirculation circuit 15. Then, the actual EGR rate decreases, so that the reduction effect of the $NO_X$ exhaust amount due to the exhaust gas recirculation is damaged. When the exhaust circuit 16 is not divided, the same effect is derived. However, when the exhaust circuit 16 is divided and the intake and exhaust bypass circuit 20 is connected to only the one of the divided passages, an absolute flow rate of the exhaust gas is reduced due to the division in the connected pipe, so that the rate of the intake air to be mixed is particularly increased. Consequently, the rate of the intake air introduced to the exhaust gas recirculation circuit 15 is also increased and a deterioration in EGR rate more remarkably appears.

Due to the above reasons, the deterioration in EGR rate can be prevented by connecting the exhaust gas recirculation circuit 15 on the more upstream side of the exhaust passage than the intake and exhaust bypass circuit 20.

Figure 10:
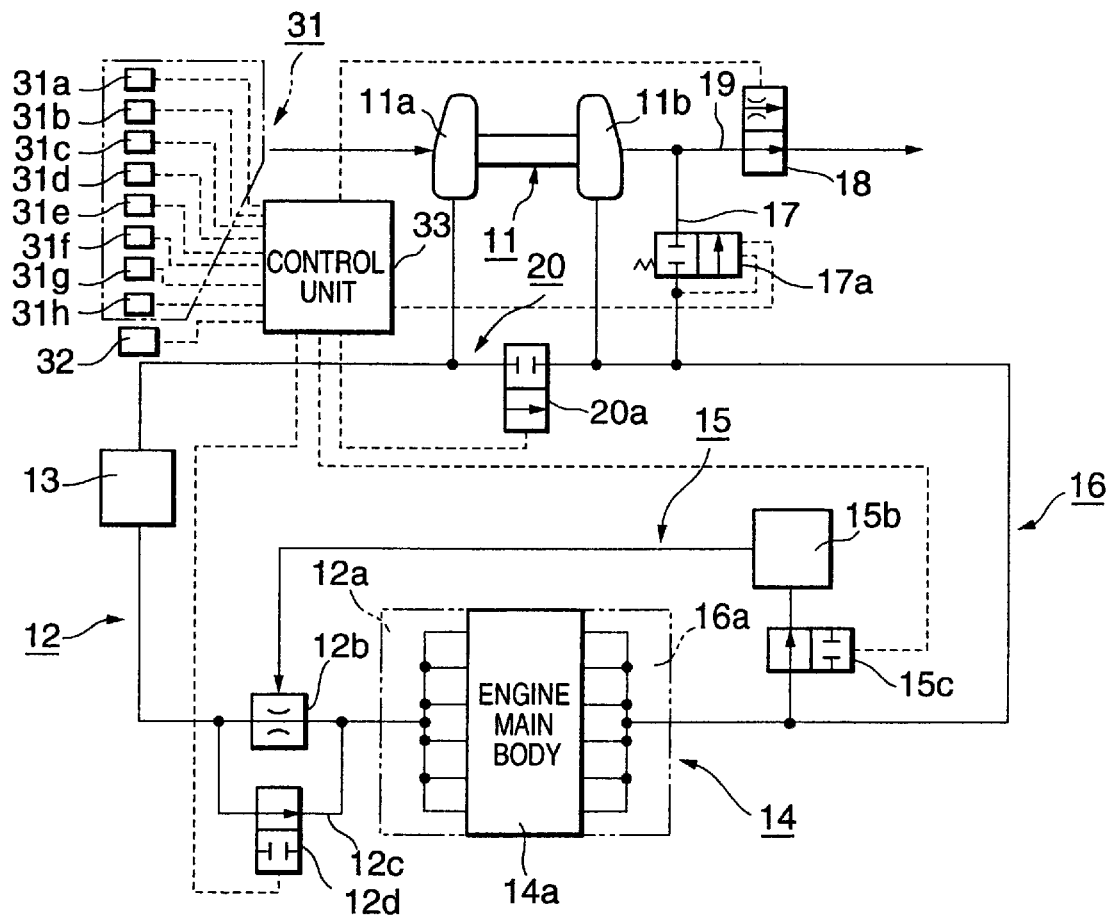
FIG. 10 is a diagram of an intake and exhaust circuit of a sixth embodiment according to the present invention.

A sixth embodiment of the present invention will now be described with reference to FIG. 10. It differs from the first embodiment with respect to the following points. Even when the pressure in the exhaust circuit 16 is smaller than the foregoing predetermined value, the control unit 33 can control the opening degree of the waste gate valve $17a$. As one of the detecting means 31, an opening degree sensor $31h$ for detecting the opening degree of the EGR valve $15c$ is provided. In addition to the $NO_X$ exhaust amount, as a control map, the storage means 32 stores a target value of each intake flow rate determined every combination of the rotating speed of the engine 14, throttle operation amount, and opening degree of the EGR valve $15c$. In response to the signals from the detecting means 31 and the storage means 32, the control unit 33 controls the opening degree of the waste gate valve $17a$ so that the actual intake flow rate to be introduced to the engine main body $14a$ is equal to the foregoing target value stored as a control map.

Figure 11:
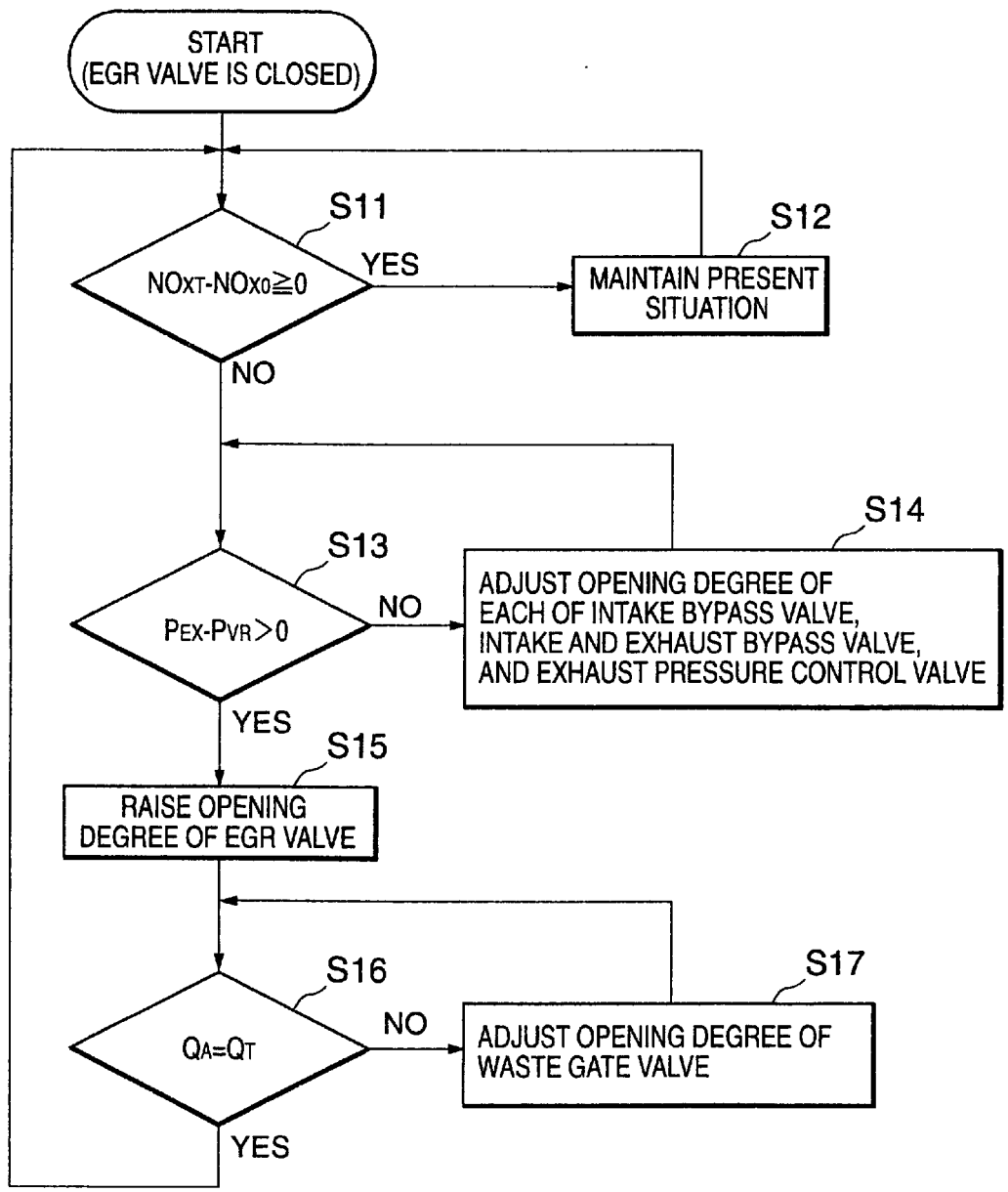
FIG. 11 is a control flowchart of control valves in the sixth embodiment.

A control flowchart of the sixth embodiment will now be described with reference to FIG. 11.

In the initial state, the EGR valve $15c$ and the intake and exhaust bypass valve $20a$ are closed and the intake bypass valve $12d$ is completely opened. First in step S11, the control unit 33 compares the $NO_X$ exhaust amount $NO_{XO}$ detected by the $NO_X$ sensor $31e$ with the $NO_X$ exhaust amount $NO_{XT}$ selected on the control map stored by the storage means 32 on the basis of the rotational speed detected by the rotational speed sensor $31a$ and the throttle operation amount detected by the potentiometer $31C$. When the expression of $NO_{XT}-NO_{XO} \geq 0$ is true, in step S12, the opening degree of each valve is kept as it is, the processing routine is returned to step S11, and the process is repeated. When the expression of $NO_{XT}-NO_{XO} \geq 0$ is false, namely, when it is determined that the $NO_X$ exhaust amount $NO_{XO}$ detected by the $NO_X$ sensor $31e$ is excessive, step S13 follows and the control unit 33 executes the following control.

In step S13, when the expression of $P_{EX}-P_{VR}>0$ is false, even if the EGR valve $15c$ is opened, the exhaust gas recirculation cannot be performed. In step S14, the control unit 33 adjusts the opening degree of each of the intake bypass valve $12d$, exhaust pressure control valve 18, and intake and exhaust bypass valve $20a$ so that the expression of $P_{EX}-P_{VR}>0$ comes true. The control unit 33 repeats the processes in steps S13 and S14 until the expression of $P_{EX}-P_{VR}>0$ comes true and the processing routine advances to step S15. As mentioned above, after the expression of $P_{EX}-P_{VR}>0$ comes true in step S13, the control unit 33 increases the opening degree of the EGR valve $15c$ in step S15. After that, the control unit 33 compares the intake flow rate $Q_A$ detected by the air flow meter $31f$ in step S16 with a target intake flow rate $Q_T$ selected on the control map stored by the storage means 32 on the basis of the rotational speed detected by the rotational speed sensor $31a$, throttle operation amount detected by the potentiometer $31c$, and opening degree of the EGR valve $15c$ detected by the opening degree sensor $31h$. In step S17, the control unit 33 adjusts the opening degree of the waste gate valve $17a$ so that the equation of $Q_A=Q_T$ comes true in step S16. After the equation of $Q_A=Q_T$ comes true in step S16, the processing routine is returned to step S11.

In addition to the function to bypass the exhaust gas to reduce the flow rate of the exhaust gas flowing into the turbine $11b$ and decrease the pressure in the exhaust circuit 16, the waste gate valve $17a$ also has a function to decrease the rotational speed of the turbocharger 11 to weaken the supercharging operation and reduce the intake flow rate $Q_A$ to be introduced to the engine main body $14a$. Accordingly, the opening degree of the waste gate valve $17a$ is adjusted, thereby enabling the intake flow rate $Q_A$ to be adjusted.

In other words, when the opening degree of the EGR valve $15c$ is large and the EGR amount $Q_{EGR}$ is large, the waste gate valve $17a$ is throttled to strengthen the supercharging operation. When the EGR valve $15c$ is throttled and the EGR amount $Q_{EGR}$ is small, the opening degree of the waste gate valve $17a$ is raised to weaken the supercharging operation. Consequently, the intake flow rate $Q_A$ is held substantially constant irrespective of a fluctuation in pressure in the intake manifold $12a$ due to the fluctuation of the EGR amount $Q_{EGR}$ and the optimum amount of oxygen for combustion is assured, so that even if the opening degree of the EGR valve $15c$ is fluctuated, the stable combustion state is obtained to enable the rotational speed of the engine not to be fluctuated.

In stead of the opening degree of the EGR valve $15c$ detected by the opening degree sensor $31h$, the EGR amount $Q_{EGR}$ can be also used as a parameter. When the structure according to the control for the waste gate valve $17a$ is applied to those of the second to fifth embodiments, the same effects are obtained.

Figure 12:
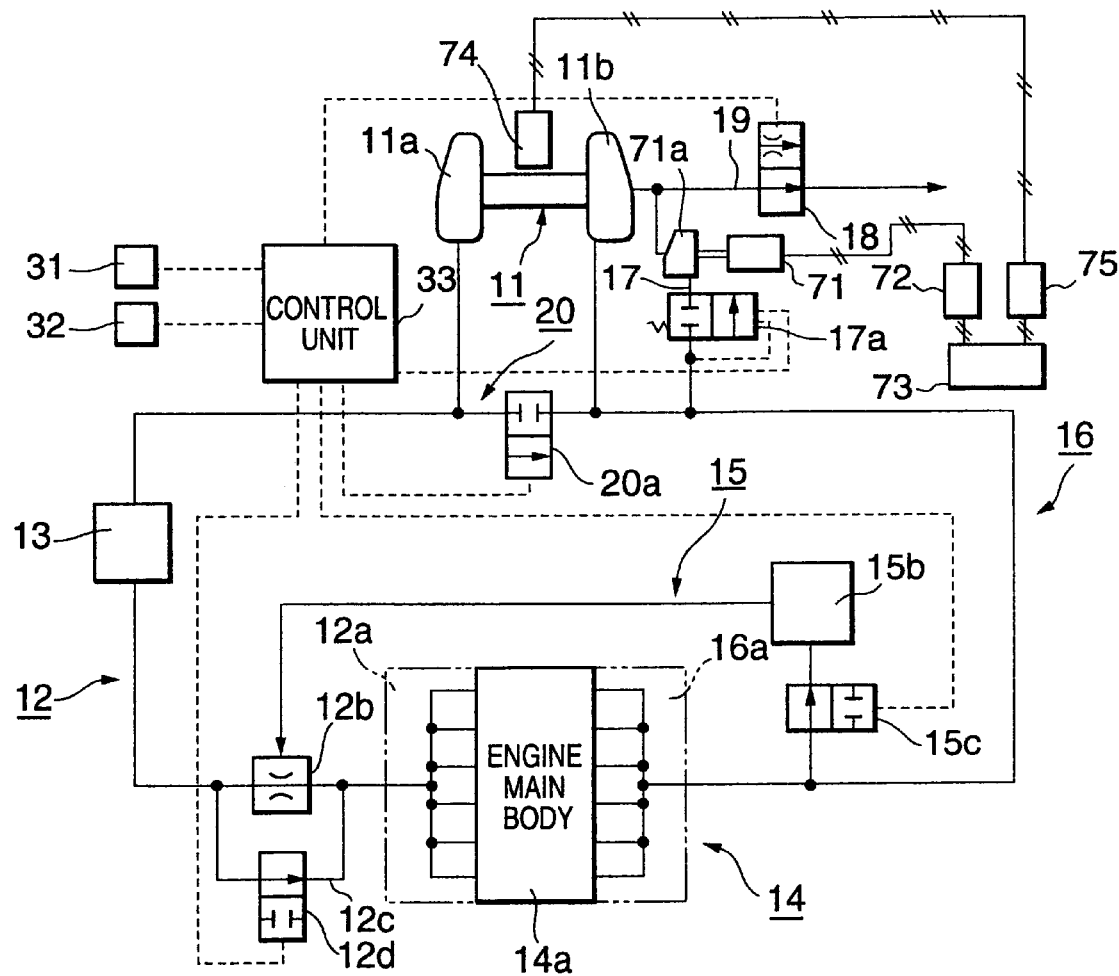
FIG. 12 is a diagram of an intake and exhaust circuit of a seventh embodiment according to the present invention.
Figure 13:
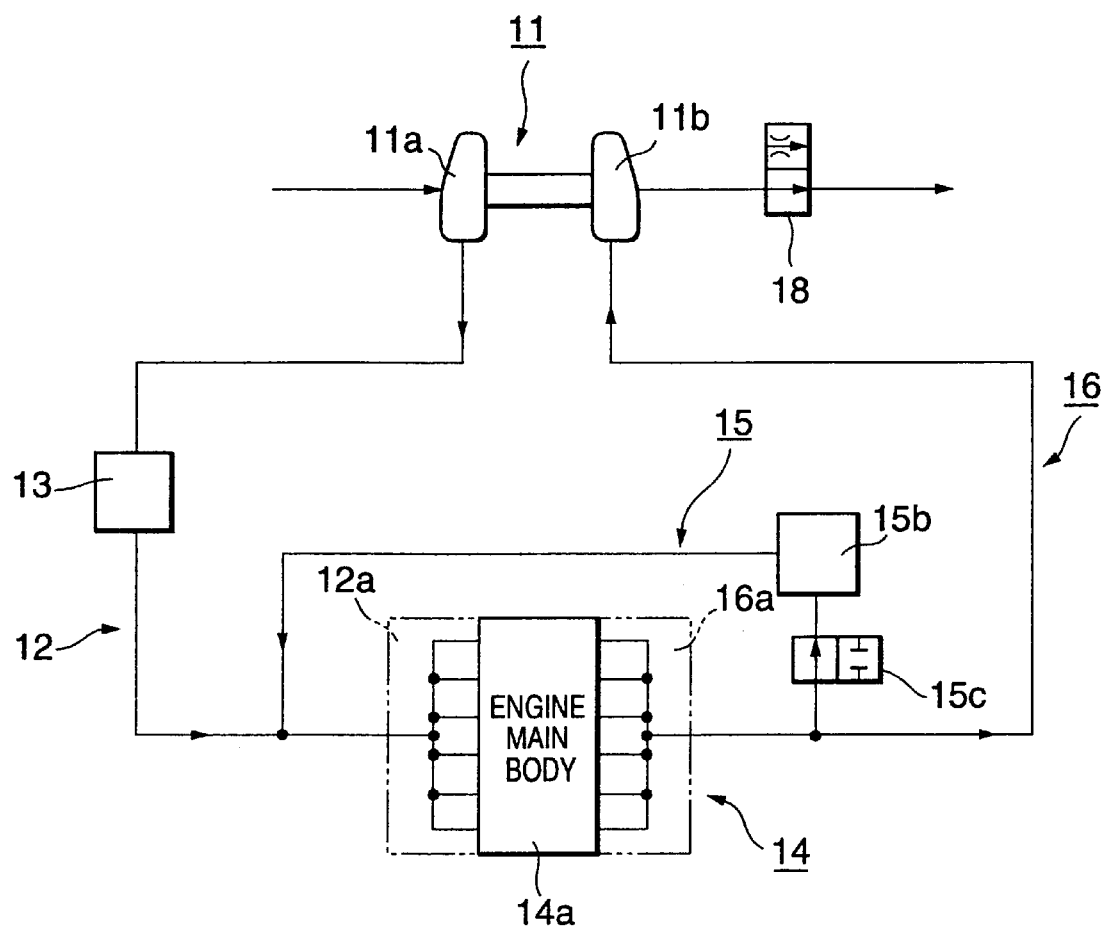
FIG. 13 is a diagram of an intake and exhaust circuit for an engine with a turbocharger having an exhaust recirculation circuit according to the prior art.

Subsequently, a seventh embodiment of the present invention will now be described with reference to FIG. 12. It differs from the sixth embodiment with respect to such a point that a generator 71, a converter 72, a battery 73, an electric motor 74, and an inverter 75 are provided.

For example, during the driving at a high speed under low loads or decelerating during which it is unnecessary to raise the supercharging pressure but the flow rate of the exhaust gas is high, the waste gate valve $17a$ is largely opened and the generator 71 provided immediately on the downstream of the waste gate valve $17a$ allows a pivotably engaged generator turbine 71a to be rotated through the pressure of the exhaust gas passing through the waste gate valve 17a, thereby generating AC power. While converting a voltage into a proper value, the converter 72 converts the AC power into DC power and the converted DC power is charged to the battery 73. Consequently, the energy of the exhaust gas which passes through the waste gate valve 17a and escapes without rotating the turbocharger 11 can be collected as electric energy.

On the other hand, during the driving at a low speed under high loads or accelerating during which it is necessary to raise the supercharging pressure but the rotational speed of the turbocharger 11 is low, the electric motor 74 is connected to the turbocharger 11 by a clutch (not shown) and the AC power obtained by converting the DC power from the battery 73 into a proper voltage value through the inverter 75 is introduced to the electric motor 74 to rotate the turbocharger, thereby promoting the driving of the turbocharger 11. Consequently, the rotational speed of the turbocharger 11 is raised, so that the supercharging pressure can be raised.

In other words, the energy of the exhaust gas is collected as electric energy during the driving at a high speed under low loads or decelerating, the energy is used to promote the turbocharger 11 during the driving at a low speed under high loads or accelerating, and the supercharging pressure can be raised. Therefore, while the energy of the exhaust gas is effectively used, the improvement of accelerating property due to a reduction in turbo lag, and a reduction in smoke and an increase in low-speed torque due to the increase in intake flow rate can be realized.

In the present embodiment, an AC generator is used as a generator 71 and an AC electric motor is used as an electric motor 74. So long as any voltage converting means is provided, a DC generator is used as a generator 71, a DC electric motor is used as an electric motor 74, and means for converting DC power into a DC voltage can be also substituted for the converters 72 and 75, respectively.

The above-mentioned operations and effects of the embodiments according to the present invention are arranged as follows.

First, the venturi and intake bypass circuit provided for the intake circuit 12 is combined to the intake and exhaust bypass circuit 20, the opening degree of each of the valves arranged in the respective portions, the pressure in the exhaust circuit 16 is raised and the pressure in the venturi portion is reduced, and the exhaust gas recirculation circuit 15 is connected to the venturi portion. Therefore, even in the area where the exhaust gas cannot be recirculated so far because the pressure in the intake circuit 12 is higher than that in the exhaust circuit 16, particularly, during driving at a medium or high speed in the high-load area, the recirculation of the exhaust gas can be permitted, so that the $NO_x$ exhaust amount can be reduced while the low fuel economy is maintained.

Since the fluctuation in intake flow rate accompanied with the increase/decrease in circulation amount of the exhaust gas is set off by adjusting the waste gate valve 17a, the optimum amount of oxygen for combustion can be always assured, so that smoother driving can be realized with no fluctuation in rotational speed of the engine 14.

Further, during driving at a high speed under low loads or decelerating, the energy of the exhaust gas is collected as electric energy by the generator driven by the pressure of the exhaust gas. During driving at a low speed under high loads or accelerating, the electric energy is used to promote the turbocharger 11 by the generator and the responsibility is improved, so that the supercharging pressure can be raised. Consequently, while the energy of the exhaust gas is effectively used, the improvement of accelerating properties due to the reduction in turbo lag, and reduction in smoke and increase in low-speed torque due to the increase in intake flow rate can be realized.

What is claimed is:

1. An exhaust gas recirculation control apparatus for an internal combustion engine, in which between an intake circuit and an exhaust circuit, a turbocharger and an exhaust gas recirculation circuit that is openable by exhaust gas recirculation switching valves are provided, comprising:

an intake and exhaust bypass circuit for connecting the downstream side of a compressor to the upstream side of a turbine of said turbocharger;

an intake and exhaust bypass valve having a variable opening area such that said intake and exhaust bypass circuit can be opened or closed, wherein a narrow portion is formed at the position of the intake circuit to which said exhaust gas recirculation circuit is branchingly connected;

an intake bypass circuit for bypassing said narrow portion of said intake circuit; and an intake bypass valve having a variable opening such that said intake bypass circuit is openable and closeable;

detecting means for detecting driving conditions of said internal combustion engine containing an EGR rate;

storage means for previously storing a target EGR rate for the driving conditions of the internal combustion engine; and control means for controlling the valve opening degree of each of said intake and exhaust bypass valve and said intake bypass valve in accordance with the driving conditions of the internal combustion engine so that the EGR rate of the internal combustion engine detected by said detecting means is equal to the target EGR rate stored by said storage means.

2. An exhaust gas recirculation control apparatus for an internal combustion engine, in which between an intake circuit and an exhaust circuit, a turbocharger and an exhaust gas recirculation circuit that is openable by exhaust gas recirculation switching valves are provided, comprising:

an intake and exhaust bypass circuit for connecting the downstream side of a compressor to the upstream side of a turbine of said turbocharger;

an intake and exhaust bypass valve having a variable opening area such that said intake and exhaust bypass circuit can be opened or closed, wherein a narrow portion is formed on the position of the intake circuit to which said exhaust gas recirculation circuit is branchingly connected;

an intake bypass circuit for bypassing said narrow portion of said intake circuit; and an intake bypass valve having a variable opening area such that said intake bypass circuit is openable and closeable;

detecting means for detecting driving conditions of said internal combustion engine containing an EGR rate;

storage means for previously storing a target EGR rate for the driving conditions of the internal combustion engine; and control means for controlling in such a manner that when said internal combustion engine is driven at a high speed under high loads, while said intake and exhaust bypass valve is substantially closed, the opening degree of said intake bypass valve is controlled so that the EGR rate of the internal combustion engine detected by said detecting means is equal to the target EGR rate stored by said storage means and, when the internal combustion engine is driven at a medium speed under high loads, while the intake and exhaust bypass valve is substantially completely opened, the intake bypass valve is substantially closed.

3. The apparatus according to claims 1 or 2, comprising:

a turbine bypass circuit for connecting the upstream side to the downstream side of said turbine of said turbocharger; and a waste gate valve which is opened to open said turbine bypass circuit when the pressure of an exhaust gas on the upstream side of the turbine is equal to or larger than a predetermined value.

* * * * *